(12) United States Patent
Vaughn

(10) Patent No.: US 12,690,581 B1
(45) Date of Patent: Jul. 28, 2026

(54) DECOY SYSTEM

(71) Applicant: Wlliam Frederick Vaughn, Bryan, TX (US)

(72) Inventor: Wlliam Frederick Vaughn, Bryan, TX (US)

(*) Notice: Subject to any disclaimer, the term of this patent is extended or adjusted under 35 U.S.C. 154(b) by 0 days.

(21) Appl. No.: 19/303,284

(22) Filed: Aug. 18, 2025

Related U.S. Application Data

(60) Provisional application No. 63/684,370, filed on Aug. 17, 2024.

(51) Int. Cl.
    *A01M 31/06* (2006.01)
(52) U.S. Cl.
    CPC .................................. *A01M 31/06* (2013.01)
(58) Field of Classification Search
    CPC ..................................................... A01M 31/06
    See application file for complete search history.

(56) References Cited

U.S. PATENT DOCUMENTS

| | | | | | |
|---|---|---|---|---|---|
| 7,043,865 B1 * | 5/2006 | Crowe | .................. | A01M 31/06 43/3 |
| 8,256,155 B1 * | 9/2012 | Goodwill | .............. | A01M 31/06 43/3 |
| 8,484,883 B2 * | 7/2013 | Rogers | .................. | A01M 31/06 43/2 |
| 2013/0014422 A1 * | 1/2013 | Bullerdick | ............ | A01M 31/06 43/3 |
| 2013/0212924 A1 * | 8/2013 | Shisko | .................. | A01M 31/06 248/176.1 |
| 2016/0324143 A1 * | 11/2016 | Beauchamp | .......... | A01M 31/06 |
| 2017/0099831 A1 * | 4/2017 | Bullerdick | ............ | A01M 99/00 |
| 2017/0202208 A1 * | 7/2017 | Beauchamp | .......... | A01M 31/06 |
| 2023/0404063 A1 * | 12/2023 | Beauchamp | .......... | A01M 31/06 |

OTHER PUBLICATIONS

Duck Moss Geaux Dux Motion Decoy System, eBay https://www.ebay.com/itm/294746362623, Jul. 15, 2024, 2 pgs.

* cited by examiner

*Primary Examiner* — Richard G Davis
(74) *Attorney, Agent, or Firm* — Mackey Law Firm PLLC

(57) ABSTRACT

A decoy system can include a frame, a housing coupled to the frame, a prime mover disposed at least partially in the housing, a first decoy mount rotateably coupled to the frame, a second decoy mount moveably coupled to the frame, and a first tie member coupled to the first decoy mount and the second decoy mount. The prime mover can selectively rotate the first decoy mount. The first tie member can translate motion to the second decoy mount. The first decoy mount and the second decoy mount can move differently. The decoy system can include a first decoy coupled to the first decoy mount and a second decoy coupled to the second decoy mount.

20 Claims, 21 Drawing Sheets

DECOY SYSTEM

CROSS-REFERENCE TO RELATED APPLICATIONS

This application claims the benefit of U.S. Provisional Patent Application No. 63/684,370 filed Aug. 17, 2024, the entire contents of which are incorporated herein by reference.

TECHNICAL FIELD

The present disclosure relates generally to hunting aids and more specifically relates to hunting decoys.

BACKGROUND

Decoys are often used for hunting. For example, duck hunters may use one or more duck decoys to draw ducks into range. However, traditional duck decoys, for example, may look like a duck, but may not move like a duck (or at all), much less like a wild duck or group of ducks. Some mechanisms exist to make decoys, such as duck decoys, move. But, where more than one movable decoy is used, such decoys typically move in the same or similar manners, such as in the same direction or about similar axes of rotation. Such similar movements do not properly mimic the movements of wild ducks, or other wild animals, and can limit the effectiveness of decoys.

SUMMARY

Applicant has created new and useful devices, systems and methods for hunting decoys. In at least one embodiment, a decoy system according to the disclosure can include multiple decoys and/or decoy mounts, and two or more of such decoys and/or decoy mounts can be arranged for moving differently from one another, such as for more effectively mimicking wild game animals. In at least one embodiment, a decoy system according to the disclosure can include multiple decoys and/or decoy mounts arranged for moving differently from one another yet driven by a single prime mover. In at least one embodiment, a decoy system according to the disclosure can include a housing having a plurality of compartments, which can include one compartment for isolating electronics from moisture and another compartment for allowing at least a portion of the system to contact water or another surrounding environment. In at least one embodiment, a decoy system according to the disclosure can be at least partially modular and can advantageously allow for selective use among various different decoys and/or decoy configurations.

In at least one embodiment, a decoy system can include a frame, a housing coupled to the frame, a prime mover disposed at least partially in the housing, a first decoy mount rotateably coupled to the frame, a second decoy mount moveably coupled to the frame, a first tie member coupled to the first decoy mount and the second decoy mount, or any combination thereof. In at least one embodiment, the prime mover can selectively rotate the first decoy mount. In at least one embodiment, the first tie member can translate motion to the second decoy mount, such as from the first decoy mount and/or the prime mover. In at least one embodiment, the decoy system can include a first decoy coupled to the first decoy mount. In at least one embodiment, the decoy system at least a portion of the housing can be disposed within the first decoy.

In at least one embodiment, the housing can include a first compartment and a second compartment. In at least one embodiment, the prime mover can be disposed in the first compartment and/or second compartment. In at least one embodiment, the decoy system can include a controller and/or a power source disposed in the other of the first and second compartments.

In at least one embodiment, the first tie member can be or include a rigid tie bar and/or rotate the second decoy mount, such as when the prime mover rotates the first decoy mount. In at least one embodiment, the first decoy mount can have a first axis of rotation. In at least one embodiment, the second decoy mount can have a second axis of rotation. In at least one embodiment, the first axis of rotation and the second axis of rotation can be at least substantially parallel to one another. In at least one embodiment, the first decoy mount can have a first degree of rotation. In at least one embodiment, the second decoy mount can have a second degree of rotation. In at least one embodiment, the first degree of rotation and the second degree of rotation can be at least substantially the same as one another or different from one another.

In at least one embodiment, the first tie member can be or include a pliable line and/or rotate the second decoy mount, such as when the prime mover rotates the first decoy mount. In at least one embodiment, the first decoy mount can have a first axis of rotation. In at least one embodiment, the second decoy mount can have a second axis of rotation. In at least one embodiment, the first axis of rotation and the second axis of rotation can be different from one another. In at least one embodiment, one of the first and second axis of rotation can be at least substantially vertical. In at least one embodiment, one of the first and second axis of rotation can be at least substantially horizontal. In at least one embodiment, one of the first and second axis of rotation can be at least substantially vertical and the other can be at least substantially horizontal.

In at least one embodiment, the decoy system can include a third decoy mount moveably coupled to the frame and/or a second tie member coupled to the second decoy mount and/or the third decoy mount. In at least one embodiment, the second tie member can translate motion to the third decoy mount. In at least one embodiment, the first tie member can be or include a rigid tie bar, and can rotate the second decoy mount, such as when the prime mover rotates the first decoy mount. In at least one embodiment, the second tie member can be or include a pliable line and can rotate the third decoy mount, such as when the prime mover rotates the first decoy mount. In at least one embodiment, the second decoy mount and the third decoy mount can have different axes of rotation. In at least one embodiment, the second decoy mount and the third decoy mount rotate in different directions. In at least one embodiment, any or all of the decoy mounts rotate in different directions. In at least one embodiment, the third decoy mount can be biased towards rotation in a first direction. In at least one embodiment, the pliable line can rotate the third decoy mount in a second direction that is opposite the first direction. In at least one embodiment, the third decoy mount can be biased towards a rest position by flotation.

In at least one embodiment, the frame can include a first frame member having a first end and a second end longitudinally opposite the first end. In at least one embodiment, the first end of the first frame member can be coupled to the housing. In at least one embodiment, the housing can be coupled to the first frame member between the first end and the second end, such as adjacent to a middle of the first frame member. In at least one embodiment, the second decoy mount can be coupled to the second end of the first frame member. In at least one embodiment, the second decoy mount can be rotateably coupled to the second end of the first frame member.

In at least one embodiment, the frame can include a second frame member having a first end and a second end longitudinally opposite the first end. In at least one embodiment, the first end of the second frame member can be coupled to the first frame member. In at least one embodiment, a third decoy mount can be coupled to the second end of the second frame member. In at least one embodiment, one end of the second frame member can be coupled to the first frame member and a third decoy mount can be coupled to the other end of the second frame member. In at least one embodiment, the third decoy mount can be rotateably coupled to the second frame member, such as the second end of the second frame member. In at least one embodiment, the first end of the second frame member can be removably coupled to the first frame member, such as between the first end and the second end of the first frame member. In at least one embodiment, the second frame member can be at least substantially perpendicular to the first frame member.

In at least one embodiment, the second decoy mount and/or the third decoy mount can be disposed rearwardly of the first decoy mount. In at least one embodiment, the third decoy mount can be disposed rearwardly of the second decoy mount. In at least one embodiment, the second decoy mount can be offset from the first decoy mount in one direction and the third decoy mount can be offset from the first decoy mount in another, different direction.

In at least one embodiment, the decoy system can include a third decoy mount coupled to the frame and a second tie member coupled to the third decoy mount. In at least one embodiment, the prime mover can selectively move any or all of the decoy mounts. In at least one embodiment, the prime mover can rotate the first decoy mount a first degree of rotation, the second decoy mount a second degree of rotation, the third decoy mount a third degree of rotation, or any combination thereof. In at least one embodiment, the second degree of rotation and/or the third degree of rotation can be different than the first degree of rotation.

In at least one embodiment, the prime mover can rotate the first decoy mount a first degree of rotation and a second degree of rotation greater than the first degree of rotation. In at least one embodiment, either or both of the second decoy mount and the third decoy mount can move after the first decoy mount surpasses the first degree of rotation. In at least one embodiment, either or both of the second decoy mount and the third decoy mount can be stationary as the first decoy mount moves through the first degree of rotation and move while the first decoy mount moves through the second degree of rotation.

In at least one embodiment, the decoy system can include one or more additional decoy mounts coupled to the frame. In at least one embodiment, any or all of the additional decoy mounts can be a moveable decoy mount movably coupled to the frame. In at least one embodiment, the prime mover can selectively move the moveable decoy mount. In at least one embodiment, all decoy mounts can be movably coupled to the frame. In at least one embodiment, the prime mover can selectively move any or all of the decoy mounts.

In at least one embodiment, the prime mover can be a servomotor. In at least one embodiment, the decoy system can include a programmable controller operably coupled to the servomotor and/or a remote control, such as in wireless communication with the controller.

In at least one embodiment, the decoy system can include one or more decoys coupled to any or all of the decoy mounts. In at least one embodiment, any or all of the decoys can be a waterfowl decoy. In at least one embodiment, any or all of the decoys can be identical. In at least one embodiment, any or all of the decoys can be different.

In at least one embodiment, a decoy system can include a frame, a housing coupled to the frame, a prime mover, a first decoy mount rotateably coupled to the frame, a second decoy mount moveably coupled to the frame, and a first tie member coupled to the first decoy mount and the second decoy mount. The prime mover can selectively rotate the first decoy mount, and the first tie member can translate motion to the second decoy mount. In at least one embodiment, the first tie member can be or include a rigid tie bar, and the rigid tie bar can rotate the second decoy mount when the prime mover rotates the first decoy mount. The first decoy mount and the second decoy mount can be configured to rotate in the same direction or in different directions. The rigid tie bar can be configured to move the first decoy mount and the second decoy mount in parallel. The rigid tie bar can be coupled to the first decoy mount and/or the second decoy mount at one or more angles, such as 90 degrees, 45 degrees, or another angle for accomplishing a desired relative movement of two or more decoy mounts in accordance with an implementation of the disclosure. For example, one or more rigid tie bars can be coupled to one or more decoy mounts at an angle for effecting movement of one decoy mount that is different from the movement of another decoy mount.

In at least one embodiment, a decoy system can include a third decoy mount moveably coupled to the frame, and a second tie member coupled to the third decoy mount, and the second tie member can translate motion to the third decoy mount. In at least one embodiment, the second tie member can be a pliable line, and the pliable line can rotate the third decoy mount when the prime mover rotates the first decoy mount, directly, indirectly, or otherwise. In at least one embodiment, the second tie member can be a rigid tie bar, and the rigid tie bar can rotate the third decoy mount when the prime mover rotates the first decoy mount.

In at least one embodiment, a decoy system can include a fourth decoy mount moveably coupled to the frame, and a third tie member coupled to the fourth decoy mount, and the third tie member can translate motion to the fourth decoy mount. In at least one embodiment, a decoy system can include a fifth and/or other decoy mounts moveably coupled to the frame, and a fourth and/or other tie members coupled to the fifth and/or other decoy mounts, and the fourth and/or other tie members can translate motion to the fifth and/or other decoy mounts. In at least one embodiment, a decoy system can include one or more stationary decoy mounts coupled to the frame. In at least one embodiment, each movable decoy mount can move differently. In at least one embodiment, one or more decoy mounts can be arranged to move less than any other decoy mount.

In at least one embodiment, a decoy system according to the disclosure can include a frame, a housing coupled to the frame, a prime mover, a first decoy mount rotateably coupled to the frame about a first axis of rotation, a second decoy mount rotateably coupled to the frame about a second axis of rotation, a first tie member coupled to the first decoy mount and the second decoy mount, or any combination thereof. In at least one embodiment, the prime mover can be disposed at least partially in the housing. In at least one embodiment, the first decoy mount can be disposed at least partially above the housing. In at least one embodiment, the prime mover can selectively rotate the first decoy mount. In at least one embodiment, the first tie member can translate motion of the first decoy mount to the second decoy mount. In at least one embodiment, a decoy system according to the disclosure can include an agitator for agitating water in which the decoy system is suspended and a second tie member for translating motion of the first decoy mount to the agitator.

In at least one embodiment, the first axis of rotation and the second axis of rotation can be at least substantially parallel, at least substantially orthogonal, or otherwise aligned relative to one another. For example, one axis of rotation can be vertically oriented and another axis of rotation can be horizontally oriented. In at least one embodiment, one or more decoy mounts can have a first degree of rotation and one or more other decoy mounts can have a second degree of rotation. In at least one embodiment, the first degree of rotation and the second degree of rotation can be the same. In at least one embodiment, the first degree of rotation and the second degree of rotation can be different.

In at least one embodiment, a decoy system according to the disclosure can include a third decoy mount rotateably coupled to the frame about a third axis of rotation. In at least one embodiment, a decoy system according to the disclosure can include a second tie member for translating motion of the first decoy mount to the third decoy mount. In at least one embodiment, either or both of the second axis of rotation and the third axis of rotation can be substantially parallel and/or substantially orthogonal with respect to the first axis of rotation. In at least one embodiment, the third decoy mount can be biased towards rotation in a first direction, such as by a spring and/or floatation. In at least one embodiment, the second tie member can rotate the third decoy mount in a second direction that is opposite the first direction.

In at least one embodiment, a decoy system according to the disclosure can include a third decoy mount and a second tie member for translating motion of the first decoy mount to the third decoy mount. In at least one embodiment, the second tie member can be a flexible line or tether. In at least one embodiment, the third decoy mount can be coupled to the frame solely through the tether.

In at least one embodiment, the frame can include a first frame member having a first end and a second end longitudinally opposite the first end. In at least one embodiment, the first end of the first frame member can be coupled to the housing and/or the first decoy mount. In at least one embodiment, the second decoy mount can be coupled to the second end of the first frame member. In at least one embodiment, the frame can include a second frame member having a first end and a second end longitudinally opposite the first end. In at least one embodiment, the first end of the second frame member can be coupled to the first frame member. In at least one embodiment, a third decoy mount can be rotateably coupled to the second end of the second frame member. In at least one embodiment, the first end of the second frame member can be removably coupled to the first frame member, such as at a location between the first end and the second end of the first frame member. In at least one embodiment, the first end of the second frame member can be selectively and/or rotatably coupled to the first frame member, such as at a location between the first end and the second end of the first frame member.

In at least one embodiment, one or more decoys, such as waterfowl decoys, can be coupled to any or all of the decoy mounts. In at least one embodiment, a first decoy can be coupled to the first decoy mount, and the housing, or a portion thereof, can be disposed within the first decoy. In at least one embodiment, one or more waterfowl decoys can be toollessly coupled to the second decoy mount. In at least one embodiment, any or all of the decoy mounts can be arranged for being removably coupled to one or more decoys, such as by way of being selectively couplable to a keel or skeg of a decoy. In at least one embodiment, one or more decoy mounts can include two or more jaws biased towards one another.

DETAILED DESCRIPTION

Figure 1:
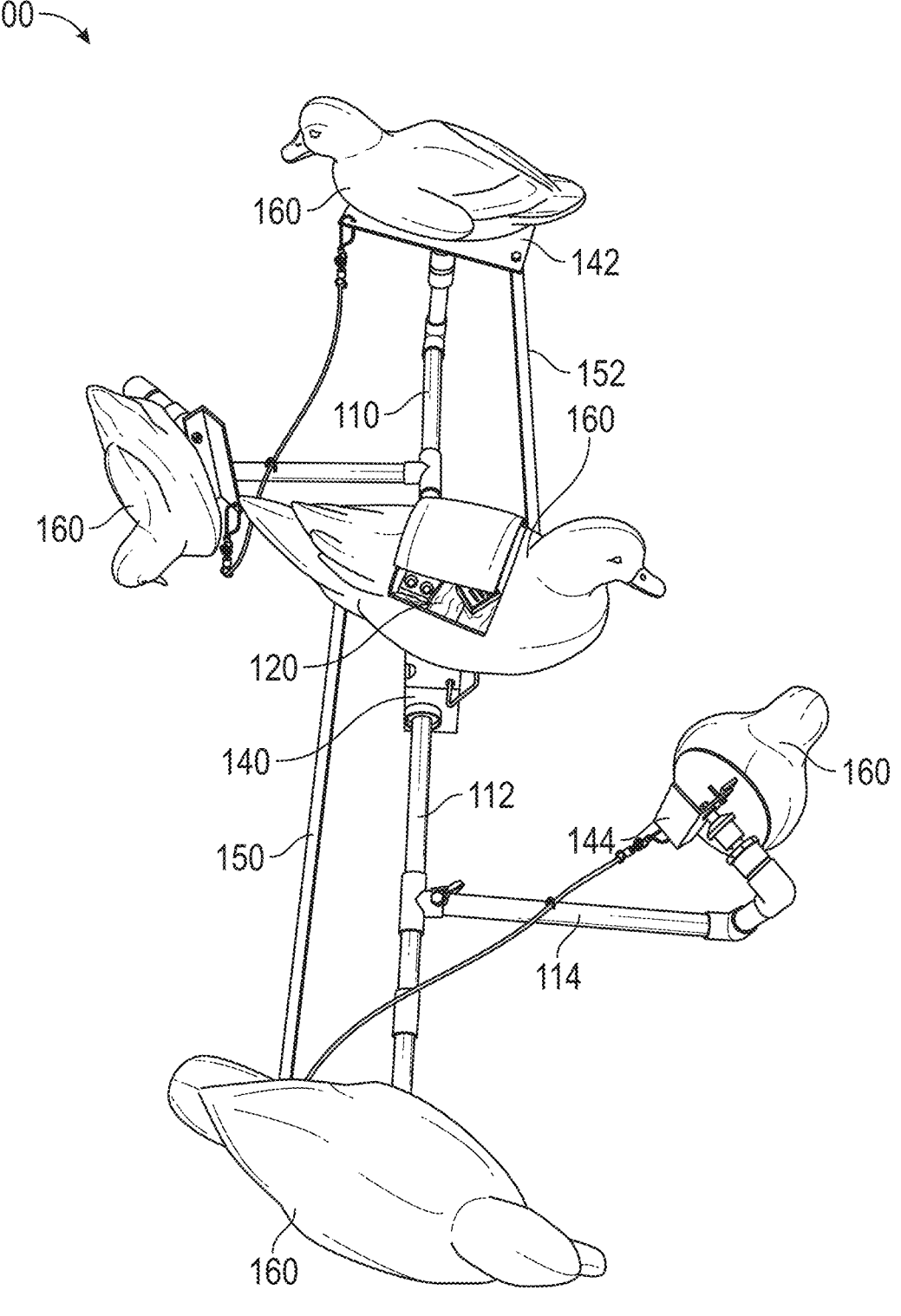
FIG. 1 is a perspective view of one of many embodiments of a decoy system according to the disclosure.

The figures described above and the written description of specific structures and functions below are not presented to limit the scope of what Applicant has invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Any process flowcharts discussed herein illustrate the operation of possible implementations of systems, methods, and computer program products according to various embodiments of the present disclosure. In this regard, each block in a flowchart may represent a module, segment, or portion of code, which can comprise one or more executable instructions for implementing the specified logical function(s). It should also be noted that, in some implementations, the function(s) noted in the block(s) might occur out of the order depicted in the figures. For example, blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Applicant has created new and useful devices, systems and methods for hunting decoys. In at least one embodiment, a decoy system according to the disclosure can include multiple decoys and/or decoy mounts, and two or more of such decoys and/or decoy mounts can be arranged for moving differently from one another, such as for more effectively mimicking wild game animals. In at least one embodiment, a decoy system according to the disclosure can include multiple decoys and/or decoy mounts arranged for moving differently from one another yet driven by a single prime mover. In at least one embodiment, a decoy system according to the disclosure can include a housing having a plurality of compartments, which can include one compartment for isolating electronics from moisture and another compartment for allowing at least a portion of the system to contact water or another surrounding environment. In at least one embodiment, a decoy system according to the disclosure can be at least partially modular and can advantageously allow for selective use among various different decoys and/or decoy configurations.

Figure 2:
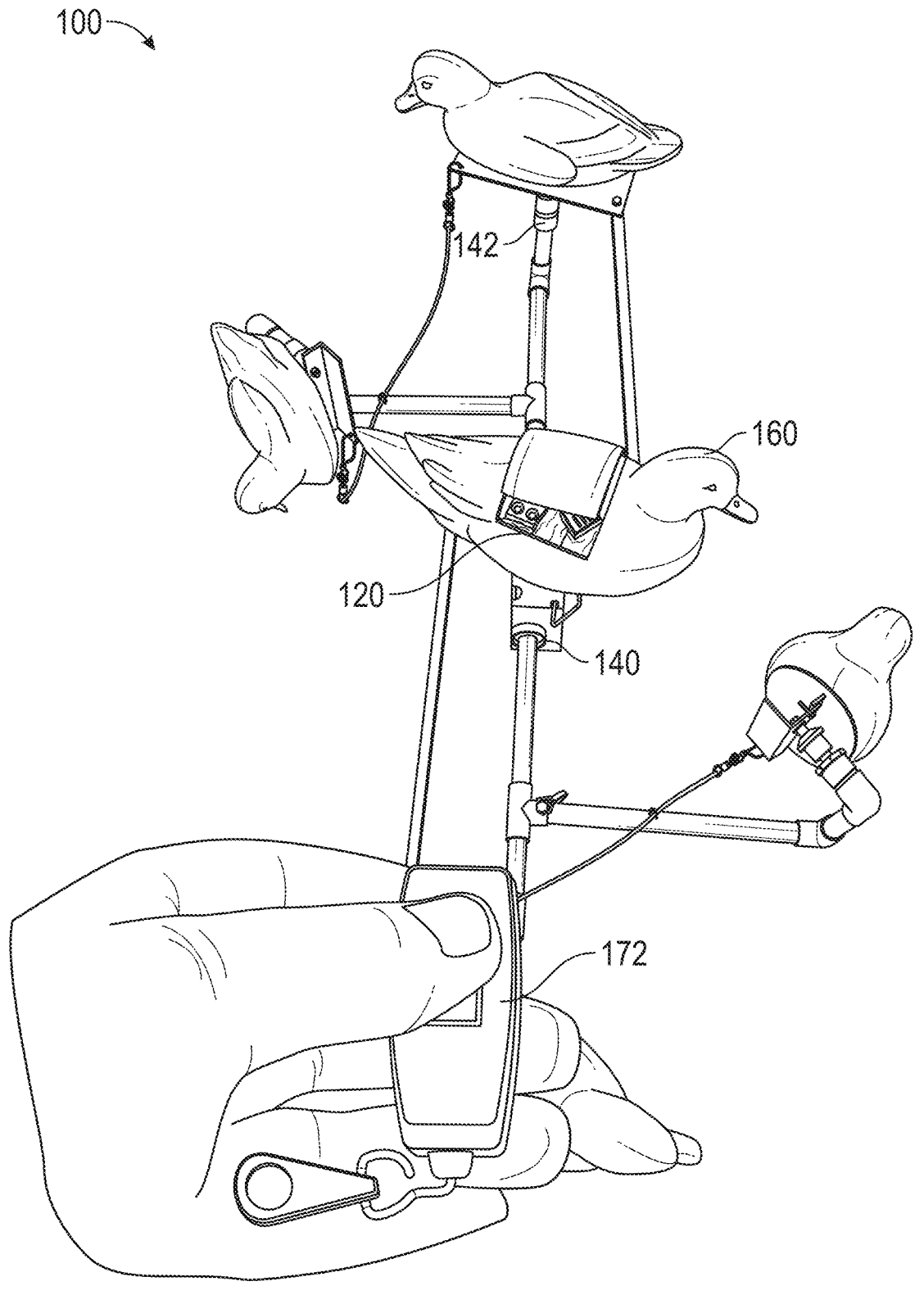
FIG. 2 is another perspective view of the decoy system of FIG. 1.
Figure 3:
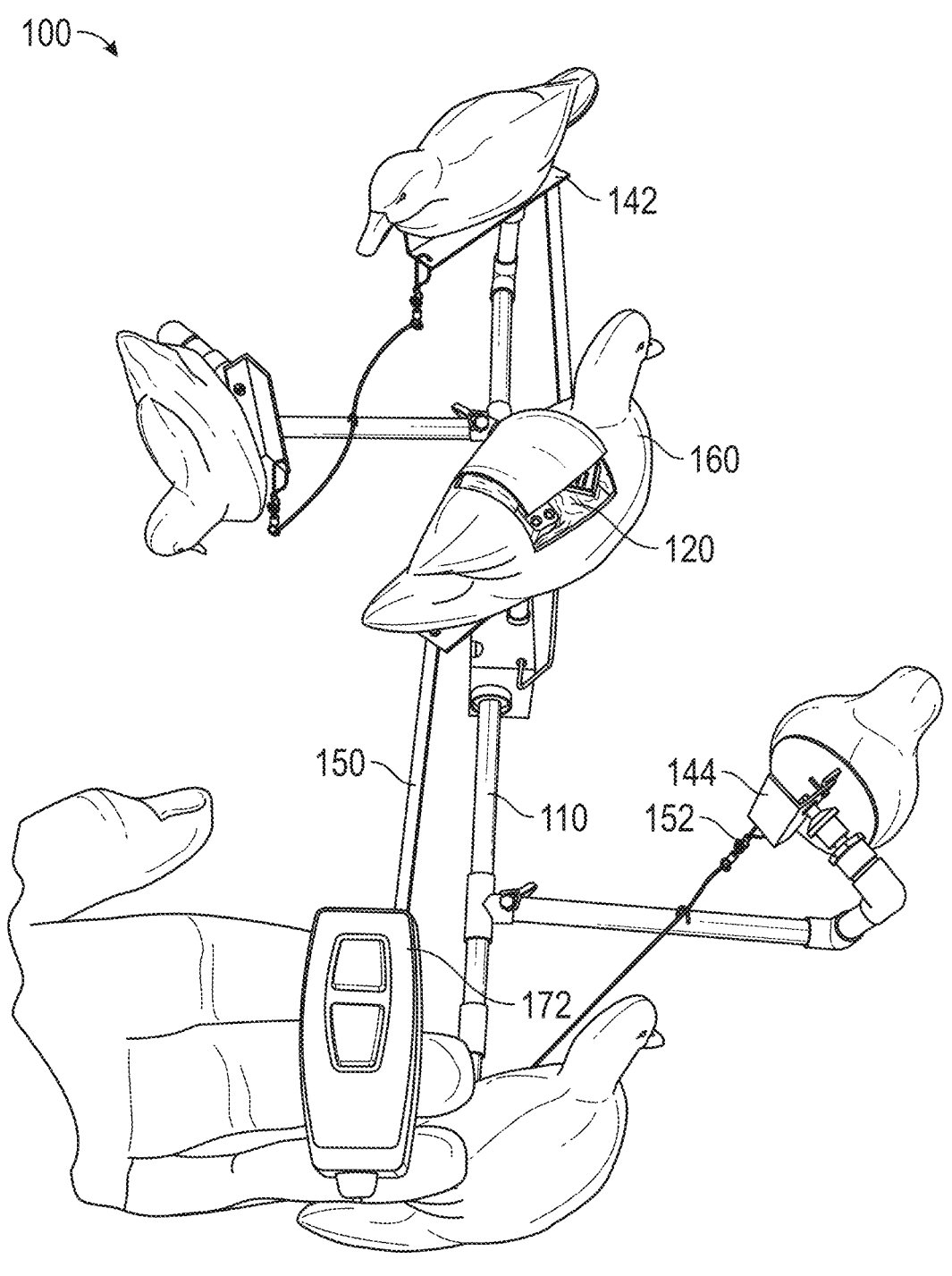
FIG. 3 is yet another perspective view of the decoy system of FIG. 1.
Figure 4:
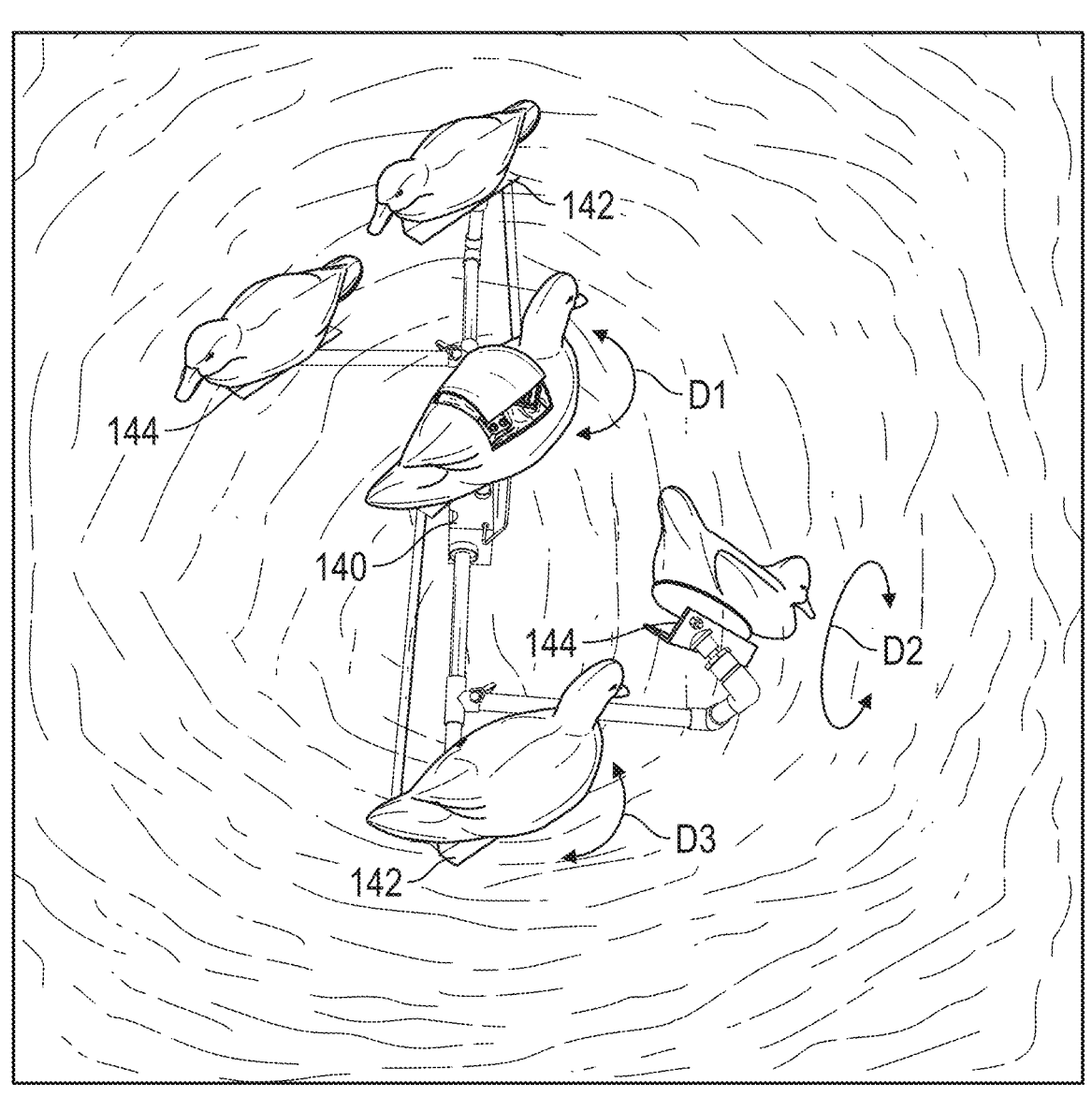
FIG. 4 is a perspective view of another one of many embodiments of a decoy system according to the disclosure.
Figure 5:
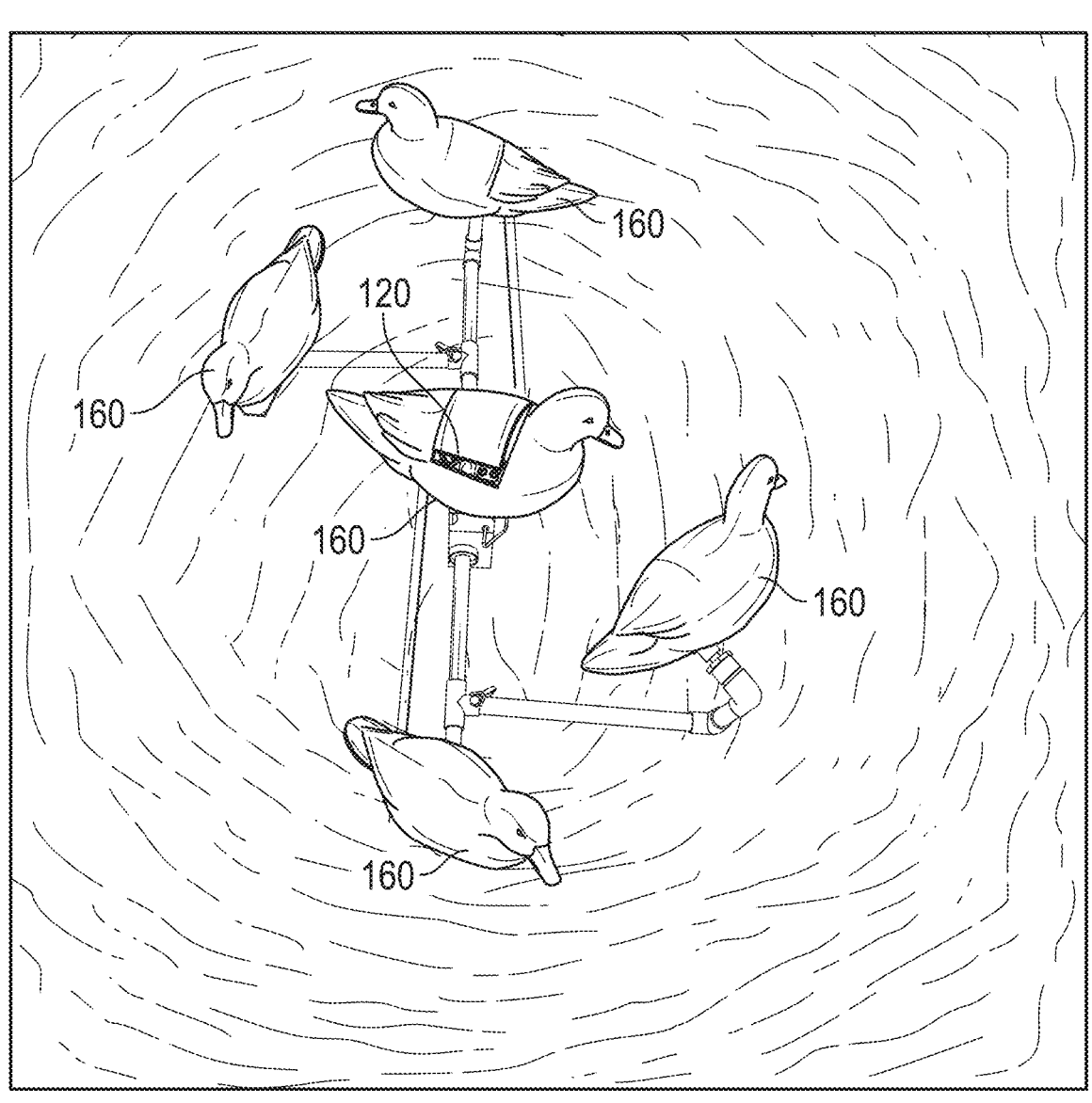
FIG. 5 is another perspective view of the decoy system of FIG. 4.
Figure 6:
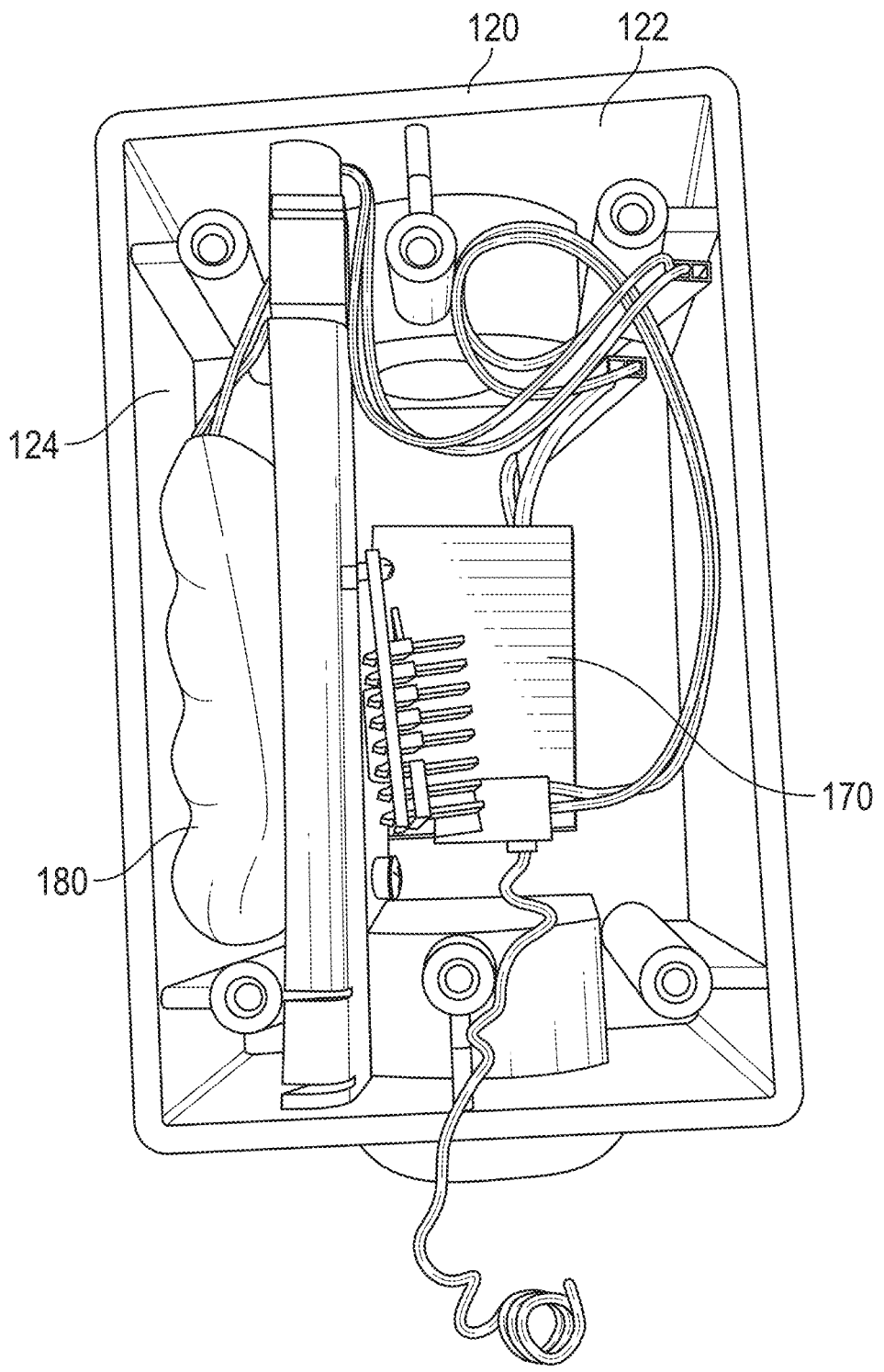
FIG. 6 is a perspective view of one of many embodiments of a housing for use with a decoy system according to the disclosure.
Figure 7:
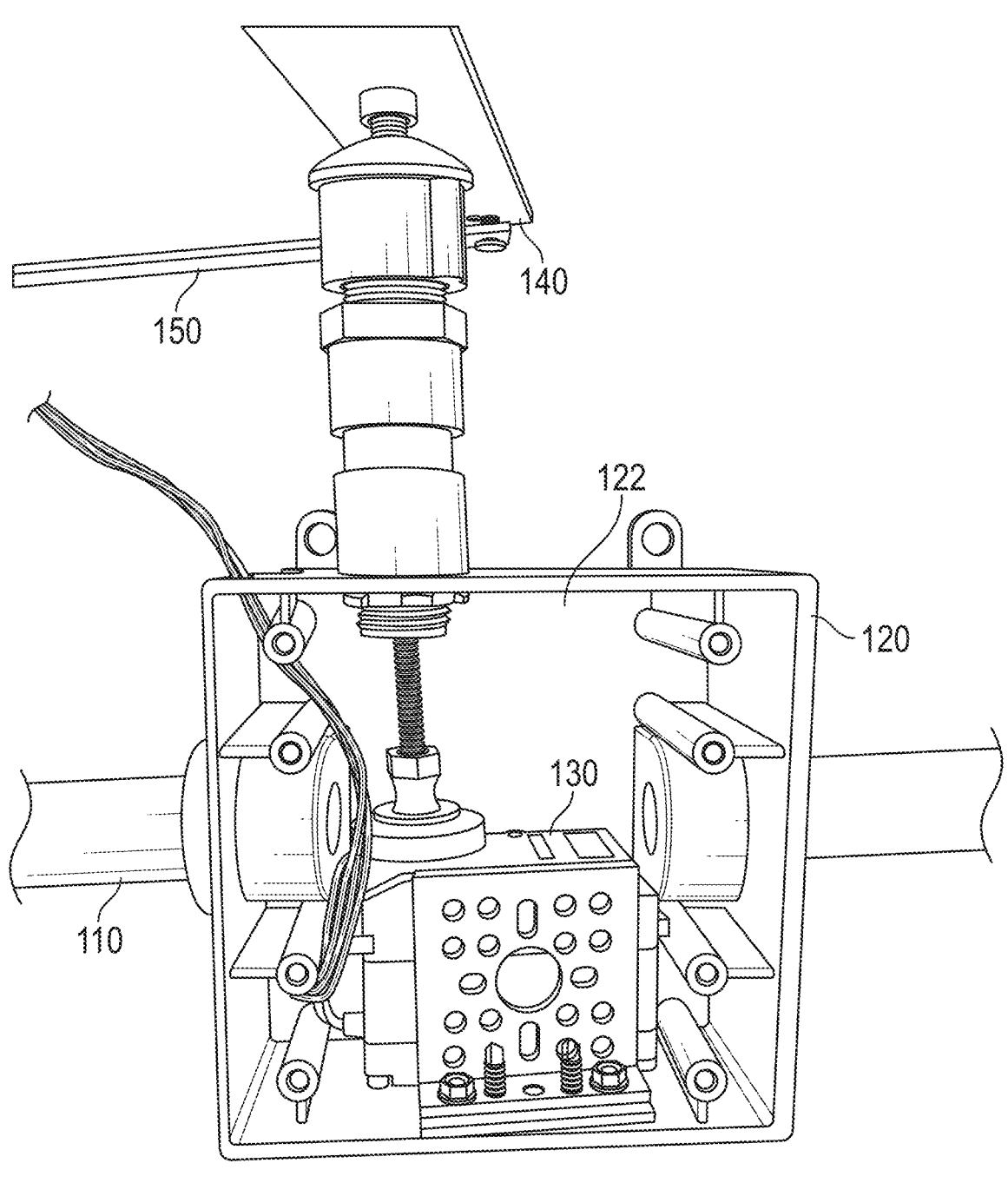
FIG. 7 is a perspective view of another one of many embodiments of a housing for use with a decoy system according to the disclosure.
Figure 8:
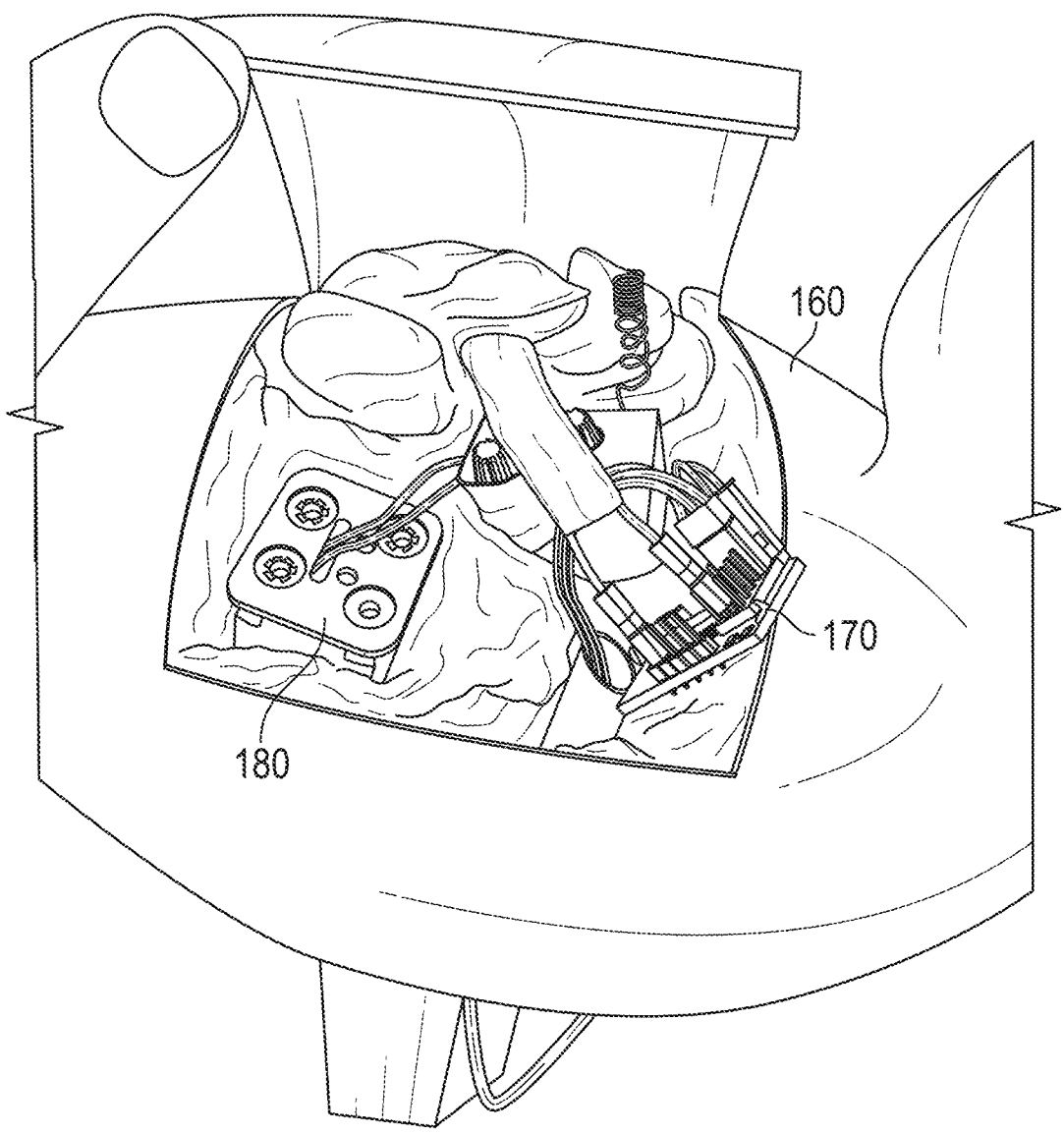
FIG. 8 is a perspective view of one of many embodiments of a decoy for use with a decoy system according to the disclosure.
Figure 9:
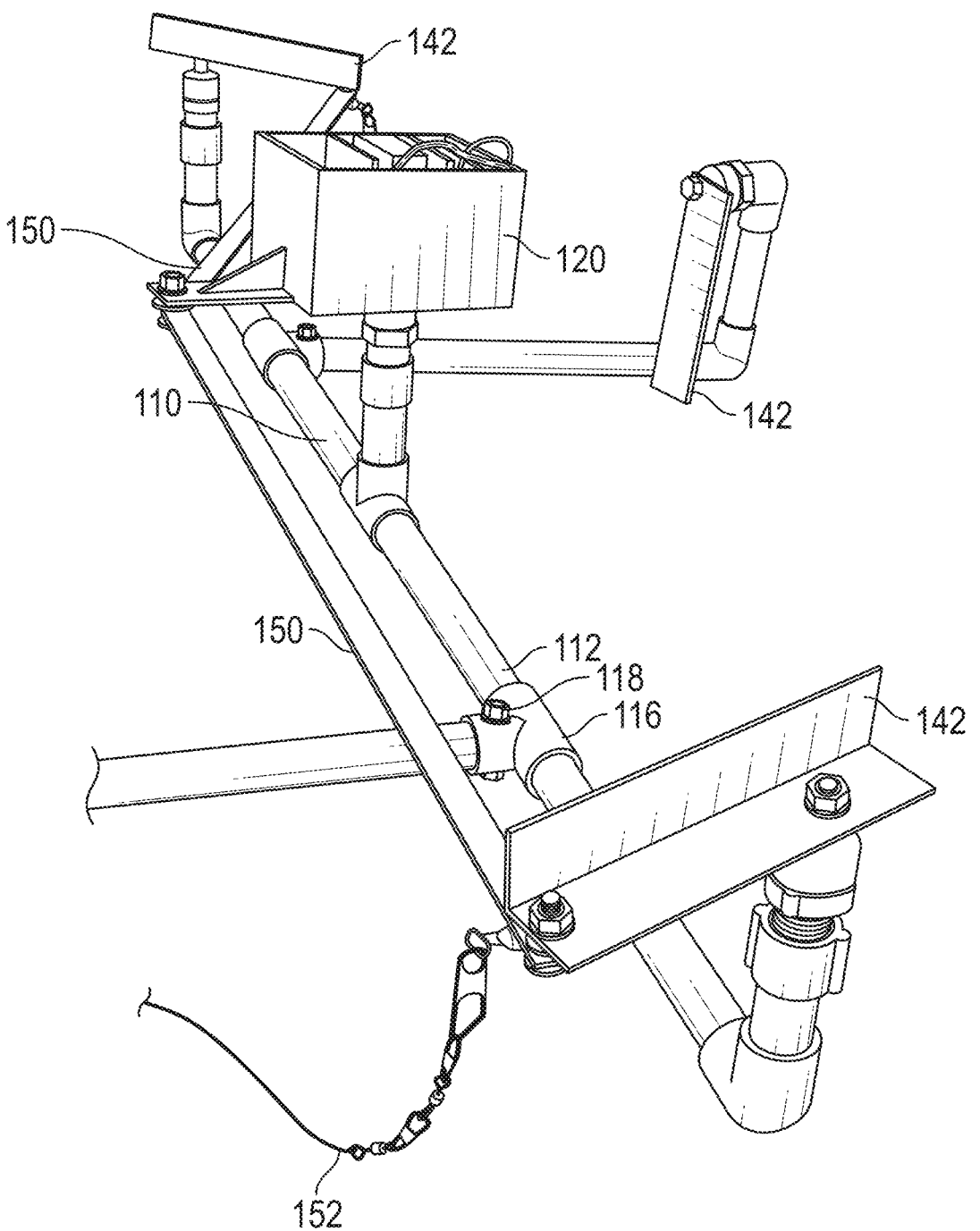
FIG. 9 is a perspective view of a portion of one of many embodiments of a decoy system according to the disclosure.
Figure 10:
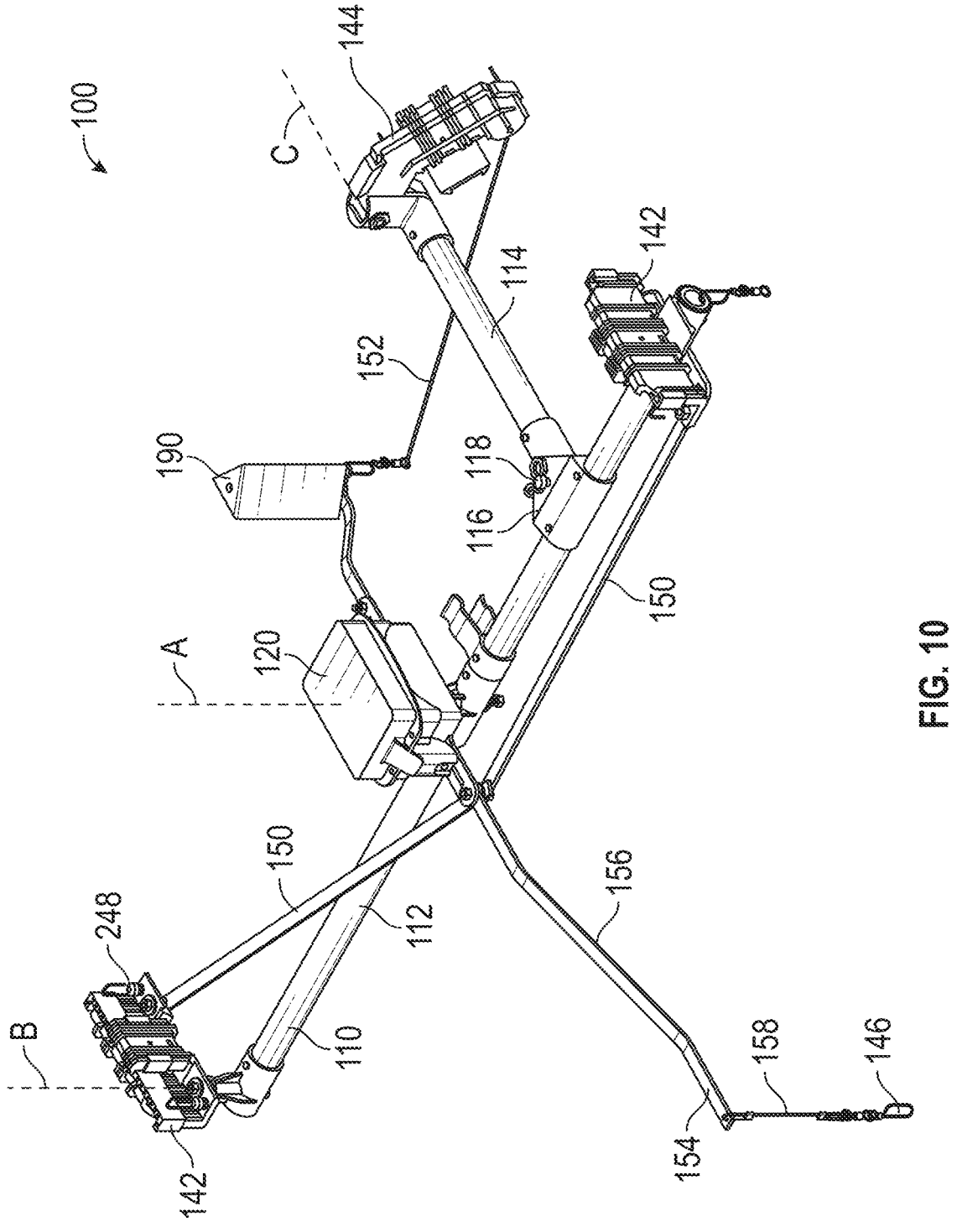
FIG. 10 is a perspective view of a portion of another one of many embodiments of a decoy system according to the disclosure.
Figure 11:
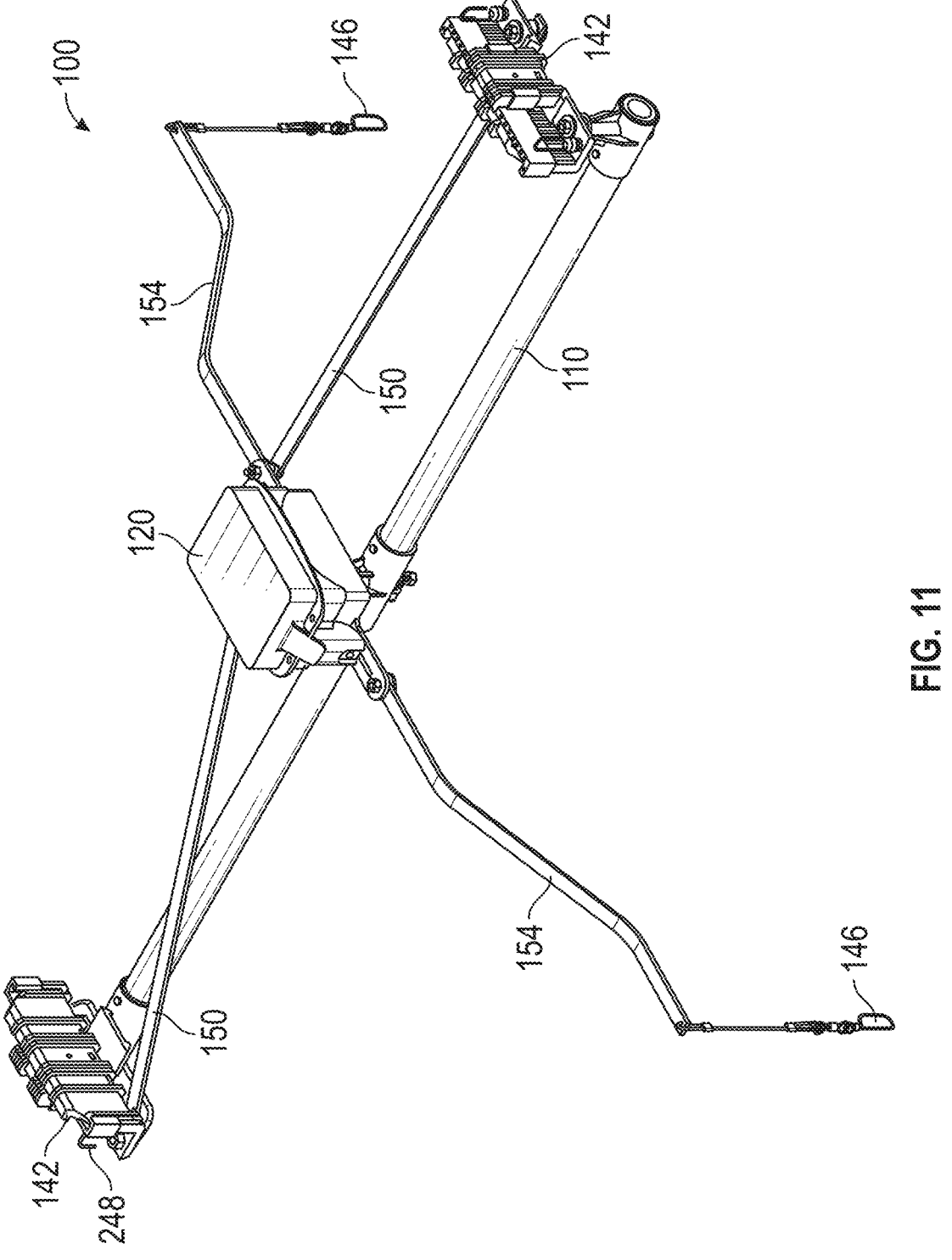
FIG. 11 is a perspective view of a portion of still another one of many embodiments of a decoy system according to the disclosure.
Figure 12:
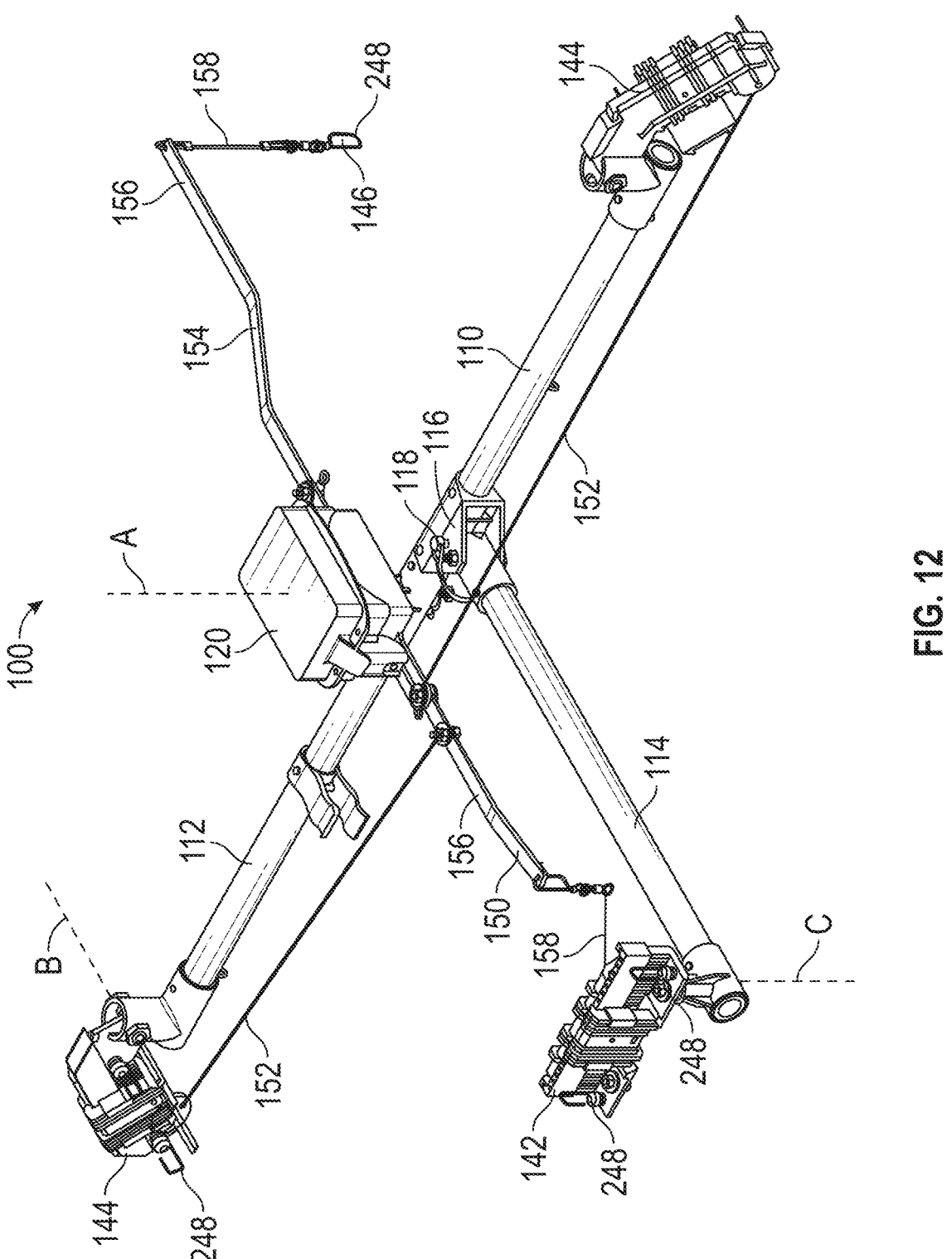
FIG. 12 is a perspective view of a portion of yet another one of many embodiments of a decoy system according to the disclosure.
Figure 13:
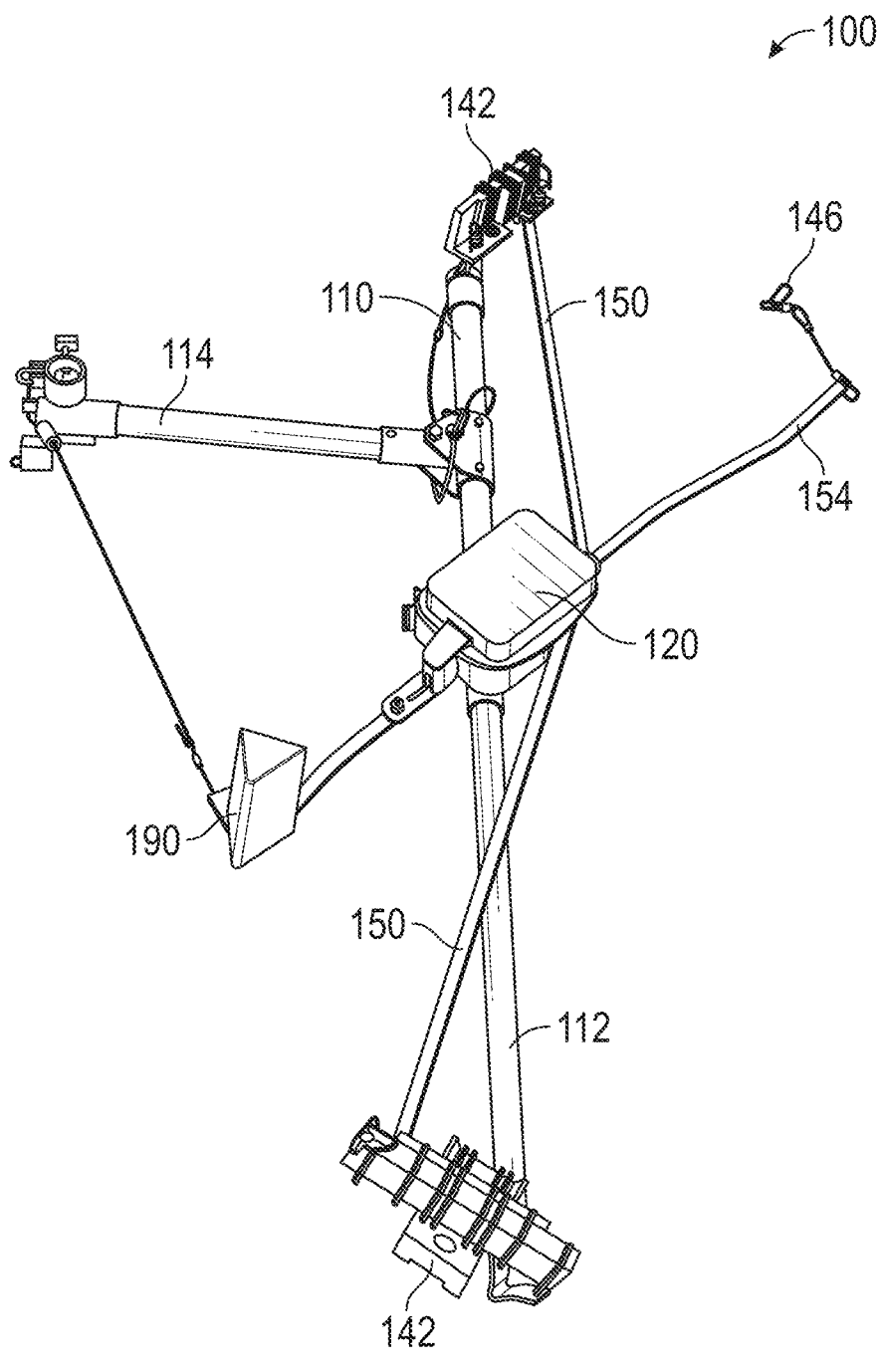
FIG. 13 is a perspective view of a portion of another one of many embodiments of a decoy system according to the disclosure.
Figure 14:
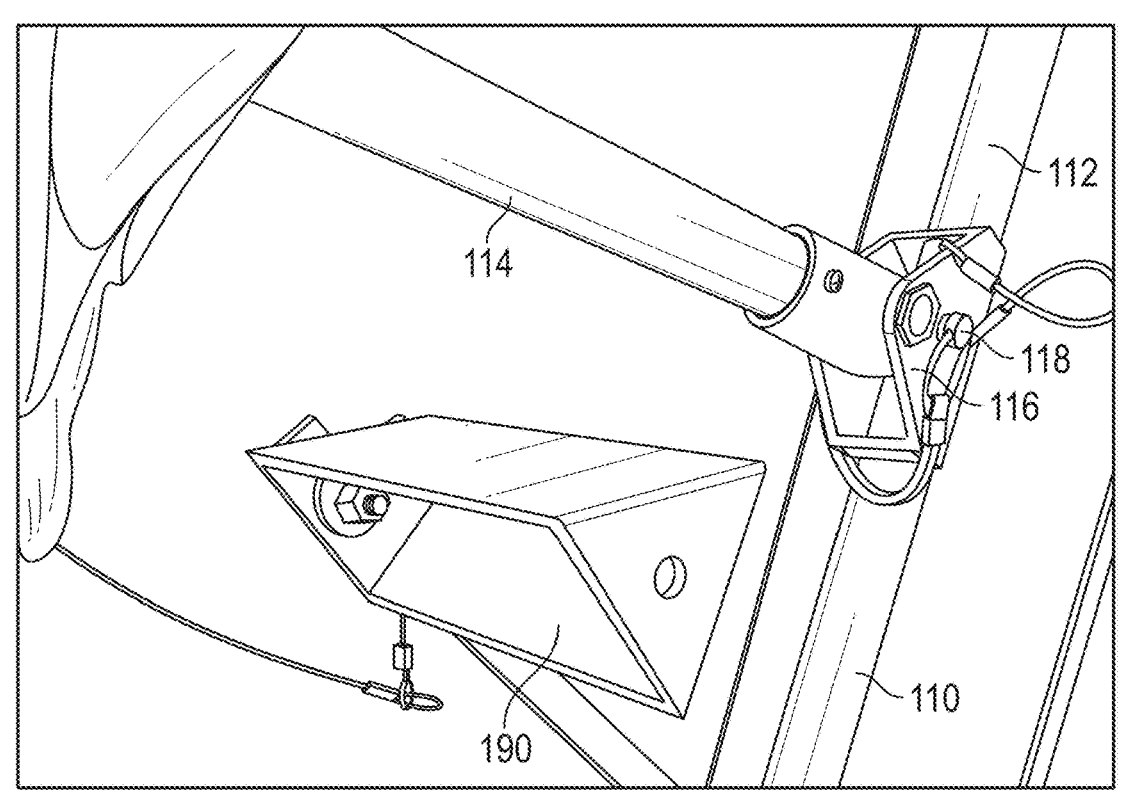
FIG. 14 is a perspective view of one of many embodiments of an agitator for use with a decoy system according to the disclosure.
Figure 15:
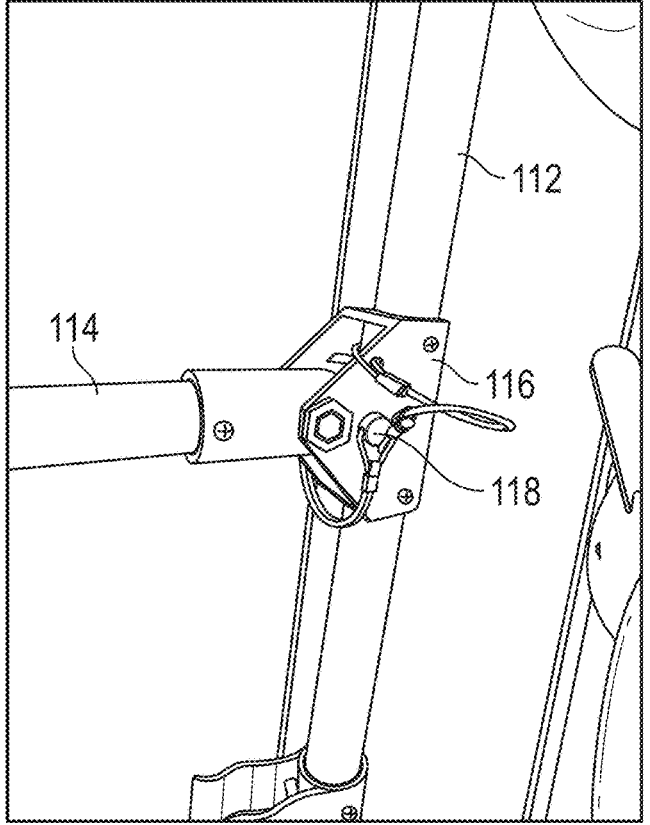
FIG. 15 is a perspective view of one of many embodiments of a coupler for use with a decoy system according to the disclosure.
Figure 16:
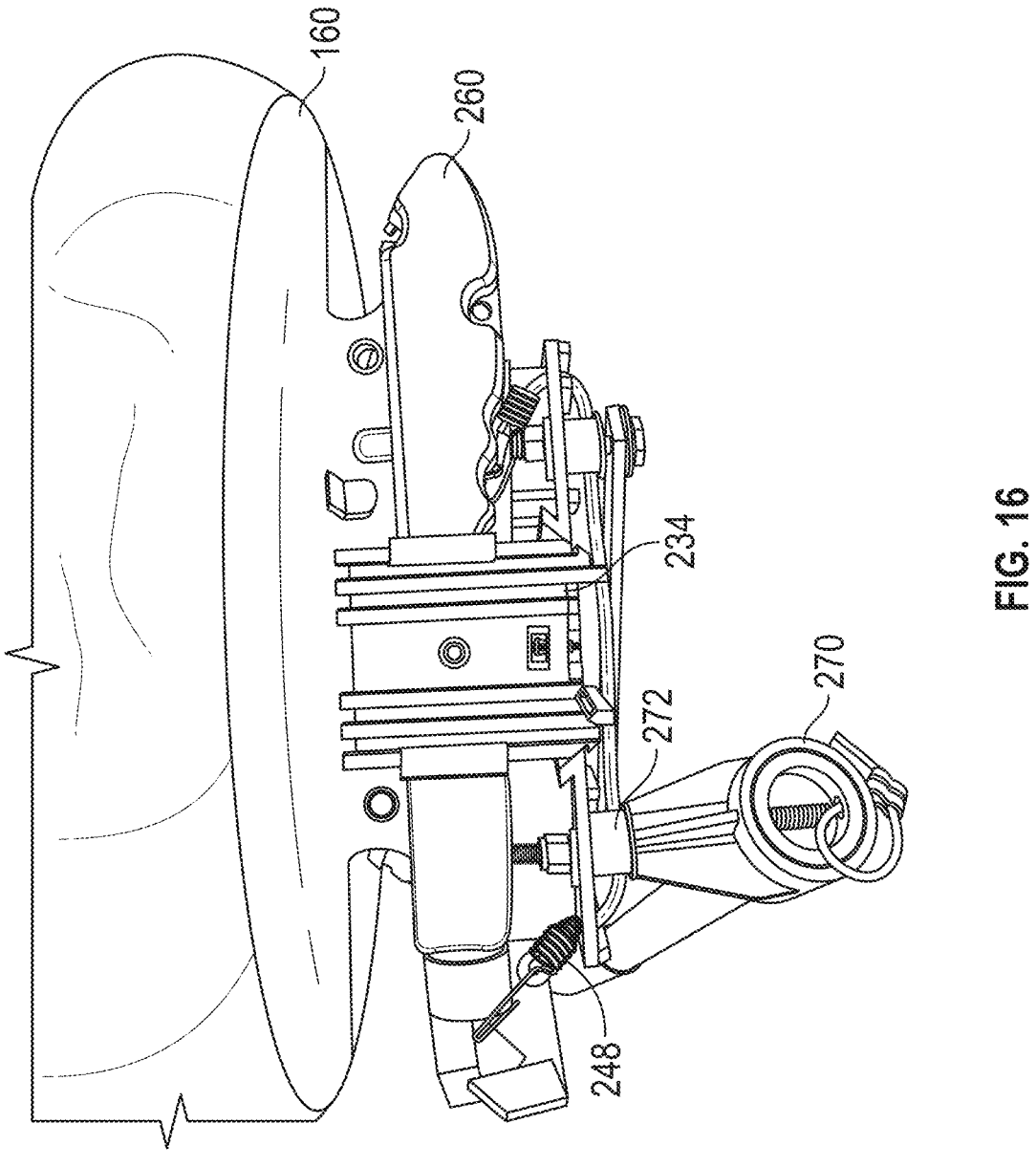
FIG. 16 is a perspective view of one of many embodiments of a decoy mount for use with a decoy system according to the disclosure.
Figure 17:
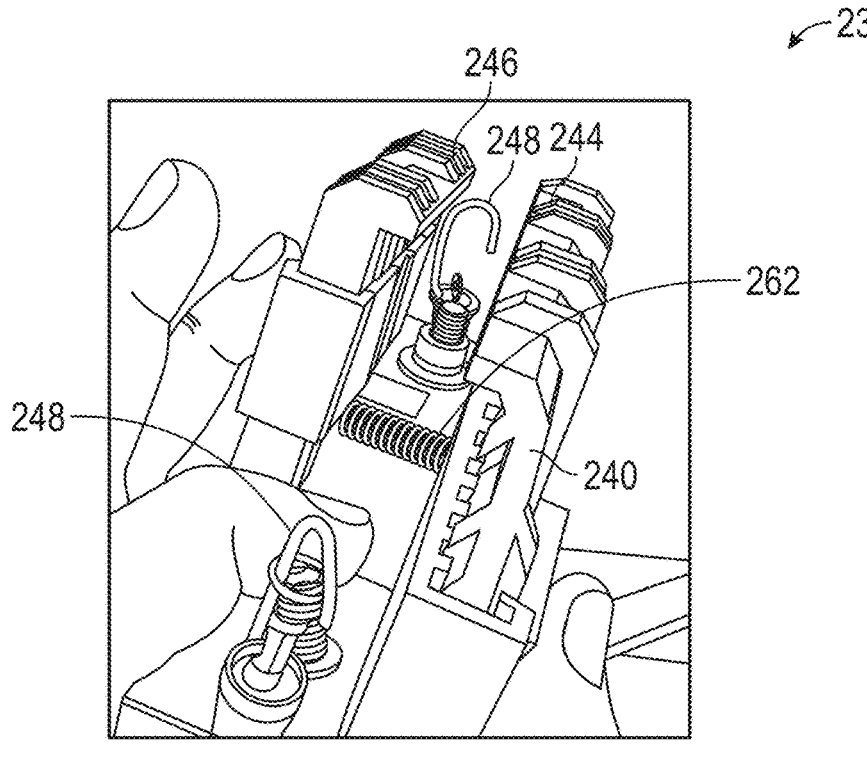
FIG. 17 is a perspective view of one of many embodiments of a decoy mount, shown in an open position, for use with a decoy system according to the disclosure.
Figure 18:
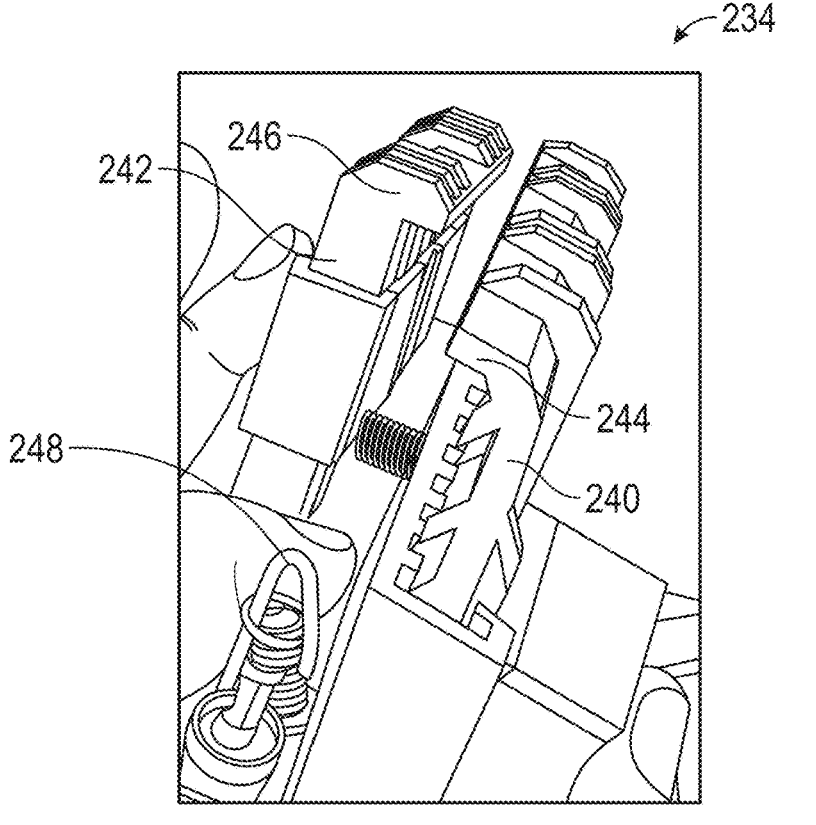
FIG. 18 is a perspective view of the decoy mount of FIG. 17, shown in a closed position.

FIG. 1 is a perspective view of one of many embodiments of a decoy system according to the disclosure. FIG. 2 is another perspective view of the decoy system of FIG. 1. FIG. 3 is yet another perspective view of the decoy system of FIG. 1. FIG. 4 is a perspective view of another one of many embodiments of a decoy system according to the disclosure. FIG. 4 is another perspective view of the decoy system of FIG. 5. FIG. 6 is a perspective view of one of many embodiments of a housing for use with a decoy system according to the disclosure. FIG. 7 is a perspective view of another one of many embodiments of a housing for use with a decoy system according to the disclosure. FIG. 8 is a perspective view of one of many embodiments of a decoy for use with a decoy system according to the disclosure. FIG. 9 is a perspective view of a portion of one of many embodiments of a decoy system according to the disclosure. FIG. 10 is a perspective view of a portion of another one of many embodiments of a decoy system according to the disclosure. FIG. 11 is a perspective view of a portion of still another one of many embodiments of a decoy system according to the disclosure. FIG. 12 is a perspective view of a portion of yet another one of many embodiments of a decoy system according to the disclosure. FIG. 13 is a perspective view of a portion of another one of many embodiments of a decoy system according to the disclosure. FIG. 14 is a perspective view of one of many embodiments of an agitator for use with a decoy system according to the disclosure. FIG. 15 is a perspective view of one of many embodiments of a coupler for use with a decoy system according to the disclosure. FIG. 16 is a perspective view of one of many embodiments of a decoy mount for use with a decoy system according to the disclosure. FIG. 17 is a perspective view of one of many embodiments of a decoy mount, shown in an open position, for use with a decoy system according to the disclosure. FIG. 18 is a perspective view of the decoy mount of FIG. 17, shown in a closed position. FIGS. 1-18 are described in conjunction with one another.

In at least one embodiment, a decoy system 100 according to the disclosure can include one or more frames 110 for supporting one or more other system components, one or more housings 120 coupled to the frame 110 and arranged for supporting one or more other system components, and one or more prime movers 130, such as a servo motor or other electric motor, disposed at least partially in the housing 120 and arranged for imparting movement to one or more other system components. In at least one embodiment, frame 100 can be or include one or more frame members 112, such as tubular or other arms or supports, for supporting placement and operation of system 100 in one or more environments, such as in a body of water, marsh, or other embodiment for waterfowl hunting. In at least one embodiment, frame 100 can include a plurality of frame members 112 coupled to one another. In at least one embodiment, frame 100 can be at least partially collapsible, and some or all of the frame members 112 can be removably coupled to one another, such as for ease of transportation and/or storage of system 100.

Figure 19:
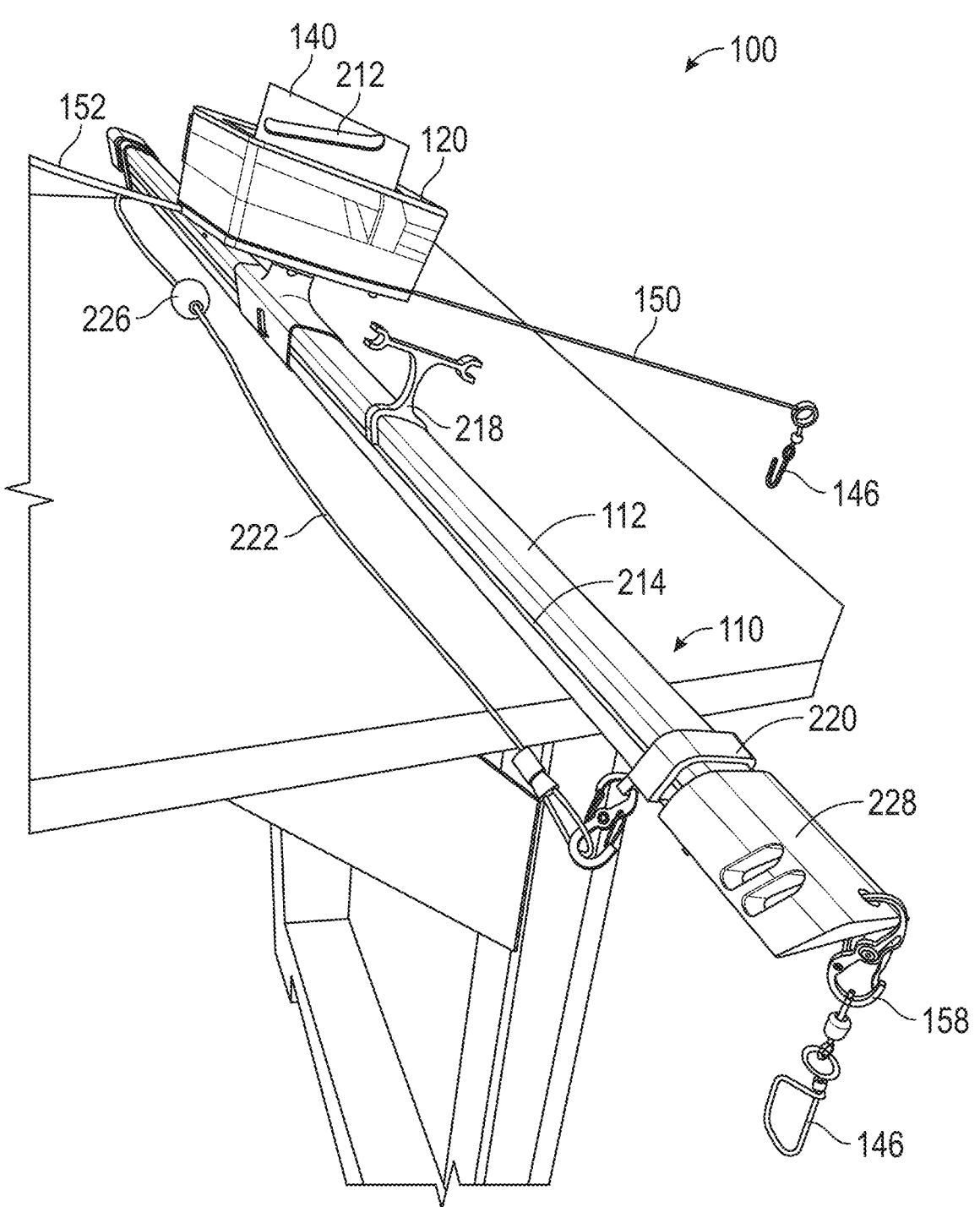
FIG. 19 is a perspective view of another one of many embodiments of a decoy system according to the disclosure.

In at least one embodiment, system 100 can include one or more decoy mounts coupled to frame 110 for supporting one or more decoys, such as duck, goose or other waterfowl decoys. In at least one embodiment, a first (or other) decoy mount 140 can be coupled to frame 110 and housing 120, and arranged for coupling a decoy 160 to housing 120, such as for at least partially disguising or camouflaging housing 120. In at least one embodiment, some or all of housing 120 can be disposed within decoy 160. In at least one embodiment, decoy 160 can be or include housing 120. In at least one embodiment, some or all of housing 120 can be rotateably coupled to frame 110, such as via one or more housing couplers 210, and/or one or more decoys 160 can be coupled to housing 120, which can include being removably coupled to housing 120. For example, in at least one embodiment, decoy mount 140 can be or include one or more structures for removably coupling one or more decoys 160 to housing 120, such as a quarter-turn connection 212 (see, e.g., FIG. 19). As other examples, decoy mount 140 can be or include one or more other structures for removably coupling such system components, such as one or more fasteners, a threaded connection, a snap-fit connection, an interference fit (or friction fit) connection, or any combination of the foregoing.

Figures 20, 21:
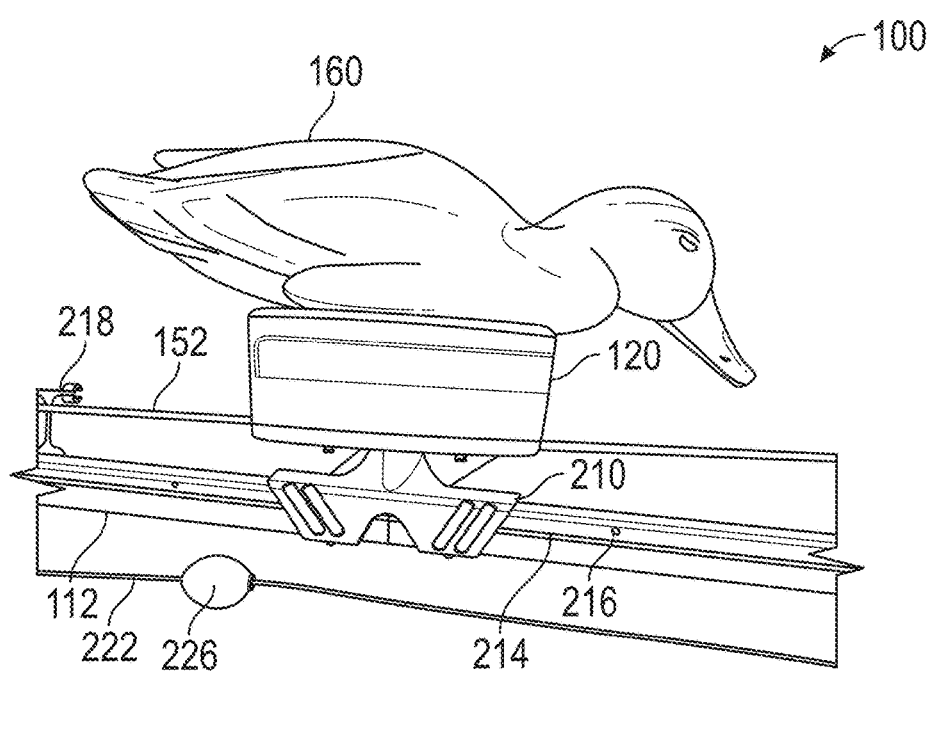
FIG. 20 is another perspective view of a portion of the decoy system of FIG. 19.
FIG. 21 is a perspective view of one of many embodiments of a decoy system frame according to the disclosure.

In at least one embodiment, frame 110 can include a plurality of tubular members 112 coupled to one another and/or to decoy mount 140 and/or housing 120, and the tubular members can be relatively smooth on the exterior, such as traditional pipes or tubing made of plastic, aluminum, and/or one or more other materials (see, e.g., FIGS. 1-3). As another example, in at least one embodiment, frame 110 or a portion thereof can be or include a more customized tubing, such as an extruded or otherwise formed tubing having a customized profile or cross-sectional shape for supporting connection with one or more other system components (see, e.g., FIGS. 19-21). For example, in at least one embodiment, frame 110 or a portion thereof, such as frame members 112, 114, can include one or more slots 214, such as grooves, and/or openings 216, such as through holes or indentations, formed in an exterior surface thereof and arranged for cooperating with one or more other system components. For instance, in at least one embodiment, system 100 can include one or more couplers for holding, coupling with, or otherwise supporting one or more other system components, such as one or more couplers 218 for guiding or otherwise cooperating with one or more tie members (further described below) and/or one or more couplers 220 for coupling with a line 222, and at least a portion of the couplers 218, 220 (and/or of housing coupler 210) can be arranged for coupling with one or more slots 214 and/or openings 216.

In at least one embodiment, at least a portion of the couplers 218, 220 (and/or of housing coupler 210) can be arranged to surround frame 100 or a portion thereof, and/or one or more couplers 218, 220 and/or housing coupler 210 can include one or more tongues 224 for selectively engaging slot 214 and/or one or more other protrusions (not shown) for selectively engaging a corresponding opening 216. For example, in at least one embodiment, one or more couplers 218, 220 and/or housing coupler 210 can be slideably coupled or couplable with frame 110, and tongues 224 and/or other protrusions can be arranged for cooperating with slot 214 and/or opening 216 to selectively, removably, and/or permanently position couplers 218, 220 and/or housing coupler 210 in desired positions along a length of frame 110 or a portion thereof. Similarly, in at least one embodiment, system 100 can include one or more end caps 228 that cooperate with frame 110 in the manner(s) described above, such as for protecting the ends of one or more frame members and/or supporting one or more other system components (see, e.g., FIGS. 19 and 21).

In at least one embodiment, one or more couplers 220 can be positioned along a length of frame 110 or a portion thereof, such as frame member 112, and arranged for cooperating with line 222. For example, in at least one embodiment, line 222 can be a weighted line, which can include having one or more fixed or slidable weights 226 disposed on line 222, and line 222 can be coupled to a coupler 220 at one end of line 222 and arranged for anchoring system 100, such as to the bed of a body of water. As another example, in at least one embodiment, line 222 can be removably or otherwise coupled to two couplers 220, such as at respective ends of line 222 or otherwise, and line 222 can be selectively utilized as a sling or carry handle during transportation of system 100 (e.g., back and forth between a boat or other vehicle and a hunting location).

In at least one embodiment, at least a portion of housing 120 can be rotateably coupled to the frame 110, and system 100 can include a second decoy mount 142 moveably coupled to the frame 110, one or more first tie members 150 coupled to the first decoy mount 140 and/or the second decoy mount 142, or any combination thereof. In at least one embodiment, the prime mover 130 can selectively rotate the first decoy mount 140 and/or at least a portion of housing 120, and system 100 can be advantageously arranged for imparting movement (which can include the same movements and/or different movements) to a plurality of different decoy mounts and/or decoys utilizing a single prime mover 130. For example, in at least one embodiment, the first tie member 150 can translate motion to the second decoy mount 142, such as from the first decoy mount 140 and/or the prime mover 130. In at least one embodiment, one or more other tie members can translate motion to one or more additional decoy mounts, such as directly from housing 120 to the one or more additional decoy mounts and/or indirectly from one decoy mount to another decoy mount. In at least one embodiment, utilizing a single type of motion from housing 120, such as rotational motion, system 100 can selectively and/or interchangeably impart motion to a plurality of decoy mounts, and any or all of the plurality of decoy mounts can be arranged for moving differently from one another (as further discussed below).

In at least one embodiment, the housing 120 can include one or more compartments, such as a first compartment 122 and a second compartment 124. In at least one embodiment, the prime mover 130 can be disposed in the first compartment 122 and/or second compartment 124. In at least one embodiment, the decoy system 100 can include a controller 170 and/or a power source 180 disposed in the other of the first and second compartments 122, 124. In at least one embodiment, the controller 170 can be programable for customizing the timing and/or movement of one or more components of the decoy system 100. In at least one embodiment, the controller 170 can precisely control the movement of a servomotor or other prime mover 130 for advantageously simulating the movement of one or more animals via decoy system 100, such as wild ducks, geese, other birds, or other animals.

In at least one embodiment, the first tie member 150 can be or include one or more rigid tie bars and/or one or more pliable lines. In at least one embodiment, the first tie member 150 can rotate the second decoy mount 142, such as when the prime mover 130 rotates the first decoy mount 140. In at least one embodiment, the first decoy mount 140 can have a first axis of rotation (see, e.g., axis A). In at least one embodiment, the second decoy mount 142 can have a second axis of rotation (see, e.g., axis B). In at least one embodiment, the first axis of rotation and the second axis of rotation can be at least substantially parallel to one another. In at least one embodiment, the first decoy mount 140 can have a first degree of rotation D1. In at least one embodiment, one or more other decoy mounts, such as a second decoy mount 142, can have a second degree of rotation D2. In at least one embodiment, the first degree of rotation and the second degree of rotation can be at least substantially the same as one another. In at least one embodiment, the first degree of rotation and the second degree of rotation can be different from one another. In at least one embodiment, the first degree of rotation can be greater than the second degree of rotation. In at least one embodiment, the first degree of rotation can be less than the second degree of rotation. In at least one embodiment, one or more other decoy mounts can have one or more other degrees of rotation, such as a third (or other) degree of rotation D3.

In at least one embodiment, the first tie member 150 can be or include a pliable line and/or rotate the second decoy mount 142, such as when the prime mover 130 rotates the first decoy mount 140. In at least one embodiment, the first decoy mount 140 can have a first axis of rotation. In at least one embodiment, the second decoy mount 142 can have a second axis of rotation. In at least one embodiment, the first axis of rotation and the second axis of rotation can be different from one another. In at least one embodiment, one of the first and second axis of rotation can be at least substantially vertical. In at least one embodiment, one of the first and second axis of rotation can be at least substantially horizontal. In at least one embodiment, one of the first and second axis of rotation can be at least substantially vertical and the other can be at least substantially horizontal.

In at least one embodiment, the decoy system 100 can include a third decoy mount 144 moveably coupled to the frame 110 and/or a second tie member 152 coupled to the second decoy mount 142 and/or the third decoy mount 144. In at least one embodiment, the second tie member 152 can translate motion to the third decoy mount 144. In at least one embodiment, the first tie member 150 can be or include a rigid tie bar, and can rotate the second decoy mount 142, such as when the prime mover 130 rotates the first decoy mount 140. In at least one embodiment, the second tie member 152 can be or include a pliable line and can rotate the third decoy mount 144, such as when the prime mover 130 rotates the first decoy mount 140. In at least one embodiment, the second decoy mount 142 and the third decoy mount 144 can have different axes of rotation. In at least one embodiment, the second decoy mount 142 and the third decoy 144 can rotate in different directions. In at least one embodiment, any or all of the decoy mounts 140, 142, 144 can rotate in different directions. In at least one embodiment, the third decoy mount 144 can be biased towards rotation in a first direction. In at least one embodiment, the pliable line 152 can rotate the third decoy mount 144 in a second direction that is opposite the first direction. In at least one embodiment, the third decoy mount 144 can be biased towards a rest position by flotation.

In at least one embodiment, the frame 110 can include one or more frame members, such as a first frame member 112 having a first end and a second end longitudinally opposite the first end. In at least one embodiment, the first end of the first frame member 112 can be coupled to the housing 120. In at least one embodiment, the housing 120 can be coupled to the first frame member 112 between the first end and the second end, such as adjacent to a middle of the first frame member 112. In at least one embodiment, the second decoy mount 142 can be coupled to the second end of the first frame member 112. In at least one embodiment, the second decoy mount 142 can be rotateably coupled to the second end of the first frame member 112.

In at least one embodiment, the frame 110 can include a second frame member 114 having a first end and a second end longitudinally opposite the first end. In at least one embodiment, the first end of the second frame member 114 can be coupled to the first frame member 112. In at least one embodiment, a third decoy mount 144 can be coupled to the second end of the second frame member 114. In at least one embodiment, one end of the second frame member 114 can be coupled to the first frame member 112 and a third decoy mount 144 can be coupled to the other end of the second frame member 114. In at least one embodiment, the third decoy mount 144 can be rotateably coupled to the second frame member 114, such as the second end of the second frame member 114. In at least one embodiment, the first end of the second frame member 114 can be removably coupled to the first frame member 112, such as between the first end and the second end of the first frame member 112. In at least one embodiment, the second frame member 114 can be at least substantially perpendicular to the first frame member 112.

In at least one embodiment, the second decoy mount 142 and/or the third decoy mount 144 can be disposed rearwardly of the first decoy mount 140. In at least one embodiment, the third decoy mount 122 can be disposed rearwardly of the second decoy mount 142. In at least one embodiment, the second decoy mount 142 can be offset from the first decoy mount 140 in one direction and the third decoy mount 144 can be offset from the first decoy mount 142 in another, different direction. In at least one embodiment, the second decoy mount 142 can be offset from the first decoy mount 140 in one direction and the third decoy mount 144 can be offset from the first decoy mount 142 in opposite direction. In at least one embodiment, the second decoy mount 142 can be offset from the first decoy mount 140 in one direction and the third decoy mount 144 can be offset from the first decoy mount 142 in substantially the same direction.

In at least one embodiment, the decoy system 100 can include a third decoy mount 144 coupled to the frame 110 and a second tie member 114 coupled to the third decoy mount 144. In at least one embodiment, the prime mover 130 can selectively move any or all of the decoy mounts 140, 142, 144. In at least one embodiment, the prime mover 130 can rotate the first decoy mount 140 a first degree of rotation, the second decoy mount 142 a second degree of rotation, the third decoy mount 14a third degree of rotation, or any combination thereof. In at least one embodiment, the second degree of rotation and/or the third degree of rotation can be different than the first degree of rotation.

In at least one embodiment, the prime mover 130 can rotate the first decoy mount 140 a first degree of rotation and a second degree of rotation greater than the first degree of rotation. In at least one embodiment, either or both of the second decoy mount 142 and the third decoy mount 144 can move after the first decoy mount 140 surpasses the first degree of rotation. In at least one embodiment, either or both of the second decoy mount 142and the third decoy mount 144 can be stationary as the first decoy mount 140 moves through the first degree of rotation and move while the first decoy mount 140 moves through the second degree of rotation.

In at least one embodiment, the decoy system 100 can include one or more additional decoy mounts coupled to the frame 110. In at least one embodiment, any or all of the additional decoy mounts can be a moveable decoy mount movably coupled to the frame 110. In at least one embodiment, the prime mover 130 can selectively move the moveable decoy mount. In at least one embodiment, all decoy mounts 140, 142, 144 can be movably coupled to the frame 110. In at least one embodiment, the prime mover 130 can selectively move any or all of the decoy mounts 140, 142, 144 (and/or one or more other decoy mounts, if present).

In at least one embodiment, the prime mover 130 can be a servomotor. In at least one embodiment, the decoy system 100 can include a programmable controller 170 operably coupled to the prime mover 130 and configured to selectively operate the prime mover 130 in one or more modes. In at least one embodiment, system 100 can include one or more remote controls in operable communication with controller 170, such as one or more dedicated remote controls 172 and/or one or more multi-purpose remote controls 174 (e.g., a smart phone, tablet, or personal computer). Any or all remote controls can be operably coupled with controller 170 via a wired connection, and/or wirelessly, such as via a Bluetooth connection, Bluetooth Low Energy connection, or the like. Similarly, in at least one embodiment, one or more dedicated remote controls 172 and/or one or more multi-purpose remote controls 174 can be arranged for communicating with one another and/or with one or more corresponding physical embodiments of system 100, such as during decoy operations. In other words, in at least one implementation of the disclosure, multiple physical embodiments of system 100 can be deployed simultaneously and one or more remote controls 172, 174 can be selectively disposed in communication with any or all of such multiple physical embodiments and/or with one another for selectively controlling such multiple physical embodiments individually or collectively and/or for selectively communicating one or more control aspects among one or more remote controls 172, 174.

In at least one embodiment, one or more multi-purpose remote controls 174 can be or include an application (or "app") arranged for being run on an electronic device (e.g., a smart phone) and including one or more graphical user interfaces ("GUI(s)") for communication with a user and supporting monitoring and/or control of one or more system operations (see, e.g., FIGS. 23-26). For example, in at least one embodiment, system 100 can include one or more home GUIs 302, one or more devices GUIs 304, one or more profiles GUIs 306, one or more logbook GUIs 308, or any combination thereof. Any or all of the GUIs can include one or more user inputs 310, such as buttons or sliders, for selectively controlling operation of one or more aspects of system 100 operations. Any or all of the GUIs can include one or more outputs 312, such as indicators or status identifiers, for selectively or otherwise displaying a status of one or more aspects of system 100 operations.

As shown in FIGS. 23-26 for illustrative purposes, for example, in at least one embodiment, system 100 can provide for pairing or connection of one or more dedicated remote controls 172 and/or one or more decoy systems or modules with a multi-purpose remote control 174, can display a connection status of one or more of such components, can display a power status of one or more of such components, can provide for the selection of a routine of one or more of such components, can provide for the running of a routine of one or more of such components, can provide for the stopping of a routine of one or more of such components, or any combination thereof. In at least one embodiment, one or more GUIs can provide for the pairing or connection of one or more additional system components, the selection, starting, stopping, addition, or deletion of one or more motion profiles, the addition, deletion, or definition of one or more motion profile steps (e.g., angle of motion, velocity of motion, acceleration of motion, duration of motion), or any combination thereof.

In at least one embodiment, the decoy system 100 can include one or more decoys 160 coupled to any or all of the decoy mounts 140, 142, 144. In at least one embodiment, any or all of the decoys 160 can be waterfowl decoys. In at least one embodiment, any or all of the decoys 160 can be identical. In at least one embodiment, any or all of the decoys 160 can be different from one another.

In at least one embodiment, a decoy system 100 according to the disclosure can include one or more frames 110, one or more housings 120 coupled to the frame 110, one or more prime movers 130, one or more decoy mounts 140, 142, 144 movably coupled to the frame 110, one or more tie members 150, 152, 154 for translating motion from the prime mover 130 and/or one or more of the decoy mounts 140, 142, 144 to any or all of the decoy mounts 140, 142, 144, one or more decoys 160 coupled to any or all of the decoy mounts 140, 142, 144, or any combination thereof. In at least one embodiment, a decoy system 100 according to the disclosure can include a first decoy mount 140 rotateably coupled to the frame 110 about a first axis of rotation, a second decoy mount 142 rotateably coupled to the frame 110 about a second axis of rotation, a first tie member 150 coupled to the first decoy mount 140 and the second decoy mount 142, or any combination thereof.

In at least one embodiment, the prime mover 130, such as a servo motor, can be disposed at least partially in the housing 120, which can be coupled to the first decoy mount 140, or below and/or within a decoy 160 coupled to the first decoy mount 140. In at least one embodiment, the first decoy mount 140 can be disposed at least partially above the housing 120. In at least one embodiment, the prime mover 130 can selectively rotate the first decoy mount 140, such as with respect to the frame 110 and/or the housing 120. In at least one embodiment, the first tie member 150, such as a rigid tie bar, can translate motion of the first decoy mount 140, housing 120, and/or prime mover 130 to the second decoy mount 142. In at least one embodiment, the first tie member 150 can translate motion of at least one of the first decoy mount 140, housing 120, and/or prime mover 130, and at least a portion of one or more others of the first decoy mount 140, housing 120, prime mover 130, and/or a decoy 160 can remain stationary.

In at least one embodiment, the first axis of rotation and the second axis of rotation can be at least substantially parallel, substantially orthogonal, or aligned somewhere in between. For example, the first axis of rotation can be substantially vertical and the second axis of rotation can be substantially horizontal. In at least one embodiment, where the first axis of rotation and the second axis of rotation are parallel, both decoy mounts 140, 142 can rotate clockwise and/or counterclockwise or one decoy mount 140, 142 can rotate clockwise when the other decoy mount 140, 142 rotates counterclockwise. In at least one embodiment, a decoy 160 coupled to a decoy mount 140, 142, 144 rotating about a vertical axis of rotation can appear to spin, or twist, on or in water on which the decoy 160, or system 100, floats. In at least one embodiment, a decoy 160 coupled to a decoy mount 140, 142, 144 rotating about a horizontal axis of rotation can appear to dive into water on which the decoy 160 floats.

In at least one embodiment, the first decoy mount 140 can have a first degree of rotation and the second decoy mount 142 can have a second degree of rotation. In at least one embodiment, the first degree of rotation and the second degree of rotation can be the same or different. For example, in at least one embodiment, the first decoy mount 140 and/or a decoy coupled to the first decoy mount 140 can rotate more or less than the second decoy mount 142 or a decoy 160 coupled to the second decoy mount 142.

In at least one embodiment, a decoy system 100 according to the disclosure can include a third decoy mount 144 coupled to the frame 110. In at least one embodiment, the third decoy mount 144 can be rotatably coupled to the frame 110 about a third axis of rotation (see, e.g., axis C). In at least one embodiment, either or both of the second axis of rotation and the third axis of rotation can be parallel (or at least substantially parallel) and/or orthogonal (or at least substantially orthogonal) with respect to the first axis of rotation.

In at least one embodiment, a decoy system 100 according to the disclosure can include a second tie member 152 for translating motion of the first decoy mount 140 and/or the prime mover 130 to the third decoy mount 144. In at least one embodiment, the third decoy mount 144 can be biased towards rotation in a first direction, such as by a spring and/or floatation. In at least one embodiment, the second tie member 152 can rotate the third decoy mount in a second direction that is opposite the first direction. For example, in at least one embodiment, the third decoy mount 144 can rotate about a horizontal axis of rotation and/or appear to dive into the water and flotation of the third decoy mount 144 or a decoy 160 coupled to the third decoy mount 144 can bias the third decoy mount 144 in the first direction and the second tie member 152 can pull the third decoy mount 144 or a decoy 160 coupled to the third decoy mount 144 in the second direction, such as into the water. In at least one embodiment, the second tie member 152 can be or include a pliable line or tether and/or a rigid tie bar.

In at least one embodiment, a decoy system 100 according to the disclosure can include a fourth decoy mount 146 and a third tie member 154 for translating motion of the first decoy mount 140 and/or the prime mover 130 to the fourth decoy mount 146. In at least one embodiment, the third tie member 154 can be or include a pliable or flexible line or tether. In at least one embodiment, the fourth decoy mount 146 can be coupled to the frame solely through the third tie member 154. For example, the fourth decoy mount 146 and/or a decoy 160 coupled to the fourth decoy mount 146 can float water and the third tie member 154 can induce motion to the fourth decoy mount 146 and/or a decoy 160 coupled to the fourth decoy mount 146 that is not limited to rotation. In at least one embodiment, the fourth decoy mount 146 and/or a decoy 160 coupled to the fourth decoy mount 146 coupled to the frame 1220 solely through the tether 154 can appear to swim around the water. In at least one embodiment, any or all tie members 150, 152, 154 can include a rigid portion 156, such as a rigid tie bar and/or a pliable or flexible portion 158, such as a pliable line or tether.

In at least one embodiment, the frame 110 can include a first frame member 112 having a first end and a second end longitudinally opposite the first end. In at least one embodiment, the first end of the first frame member 112 can be coupled to the housing 120 and/or the first decoy mount 140. In at least one embodiment, the second decoy mount 142 can be coupled to the second end of the first frame member 112. In at least one embodiment, the frame 110 can include a second frame member 114 having a first end and a second end longitudinally opposite the first end. In at least one embodiment, a decoy mount 142, 144, 146 can be coupled to the second end of the second frame member 114. In at least one embodiment, a decoy mount 142, 144, 146 can be rotateably coupled to the second end of the second frame member 114.

In at least one embodiment, at least a portion of the frame 110 can be collapsible. In at least one embodiment, the first end of the second frame member 114 can be coupled to the first frame member 112, such as via a coupler 116, which can be disposed along the first frame member 112 between the first end and the second end of the first frame member 112. In at least one embodiment, the coupler 116 can removably and/or rotatably couple the first end of the second frame member 114 to the first frame member 112. In at least one embodiment, the coupler 116 can be or include a socket into which the first end of the second frame member 114 can be selectively and/or removably disposed. In at least one embodiment, the coupler 116 can be or include a pin 118 that can retain the first end of the second frame member 114 in the socket and/or fix an angular position of the second frame member 114 with respect to the first frame member 112. In at least one embodiment, the coupler 116 can facilitate toolless full or partial assembly and/or disassembly of the decoy system 100, such as for transportation and/or storage. In at least one embodiment, the frame 110 can include one or more clips to secure the second frame member 114 relative to one or more other portions of the system, such as when folded or removed for transportation and/or storage.

In at least one embodiment, one or more decoys 160, such as waterfowl decoys, can be coupled to any or all of the decoy mounts 140, 142, 144, 146. In at least one embodiment, a first decoy 160 can be coupled to the first decoy mount 140, and the housing 120, or a portion thereof, can be disposed within the first decoy 160. In at least one embodiment, one or more of the waterfowl decoys 160 can be coupled to any or all of the decoy mounts 140, 142, 144, 146 using fasteners. In at least one embodiment, one or more of the waterfowl decoys 160 can be toollessly coupled to any or all of the decoy mounts 140, 142, 144, 146. In at least one embodiment, any or all of the decoy mounts 140, 142, 144, 146 can be or include one or more clamping mechanisms 234 for removably coupling with the decoy(s) 160. In at least one embodiment, a clamping mechanism 234 can be arranged for clamping or otherwise coupling with a bottom portion 260 of a decoy 160, such as a counter weight, skeg, keel, or underside of a decoy 160, which can advantageously provide for quick and easy coupling with any of various decoy types, models, structures and/or configurations.

In at least one embodiment, a clamping mechanism 234 can include one or more jaws for coupling with a decoy 160, such as a first jaw 240 and a second jaw 242, and jaws 240, 242 can be biased towards one another (e.g., towards a closed position), such as via one or more springs or other biasing devices 262. In at least one embodiment, the first jaw 240 can include a first flange 244 protruding inwardly towards the second jaw 242 for supporting coupling with a decoy 160. In at least one embodiment, the second jaw 242 can include a second flange 246 protruding inwardly towards the first jaw 240 for supporting coupling with a decoy 160. In at least one embodiment, any of a number of different decoys 160 can be selectively clamped between the first jaw 240 and the second jaw 242 of a corresponding decoy mount 140, 142, 144, 146 (and/or one or more other decoy mounts, if present).

Figure 22:
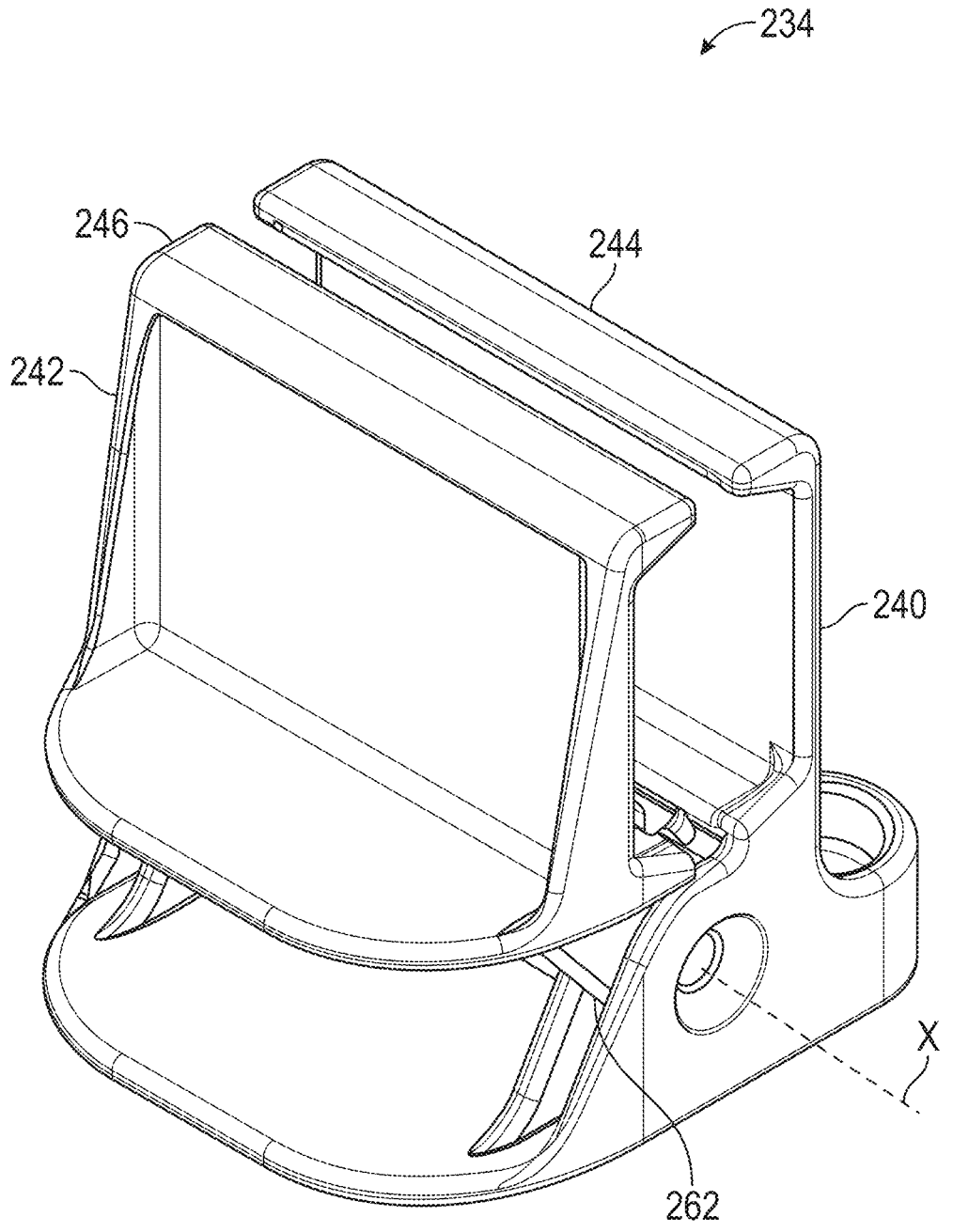
FIG. 22 is a perspective view of another one of many embodiments of a decoy mount according to the disclosure, shown in a closed position.
Figure 24:
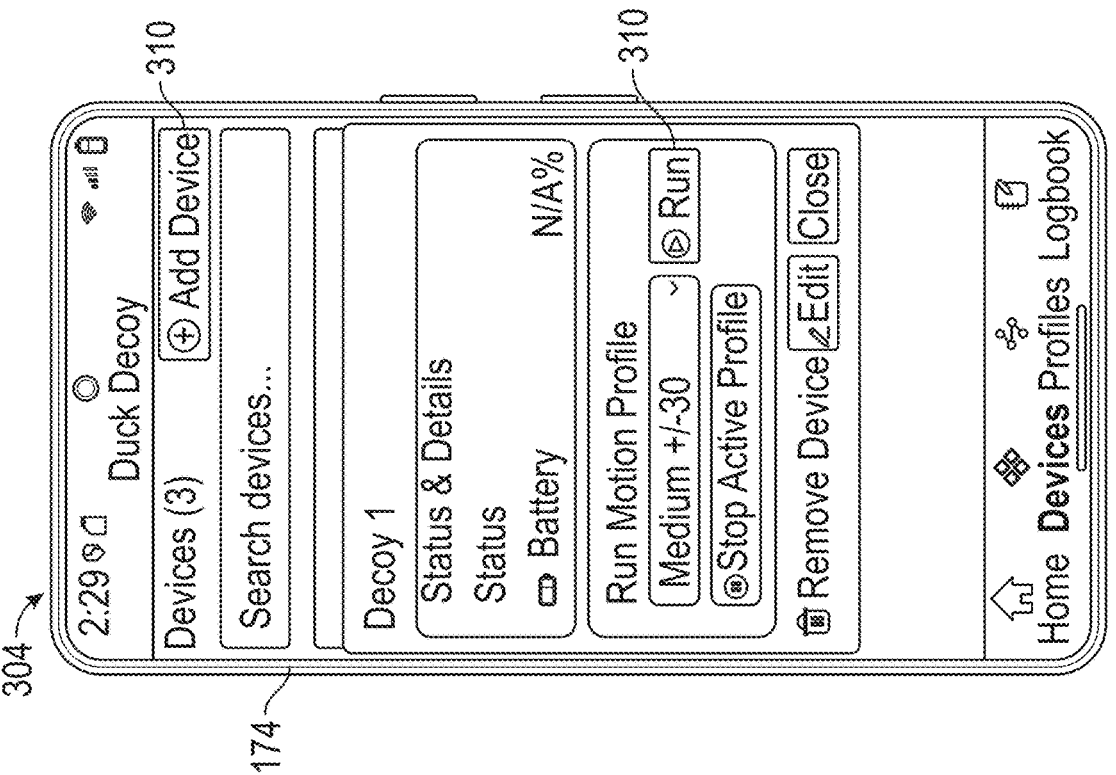
FIGS. 23-26 illustrate some of many embodiments of graphical user interfaces for a decoy system according to the disclosure.
Figure 23:
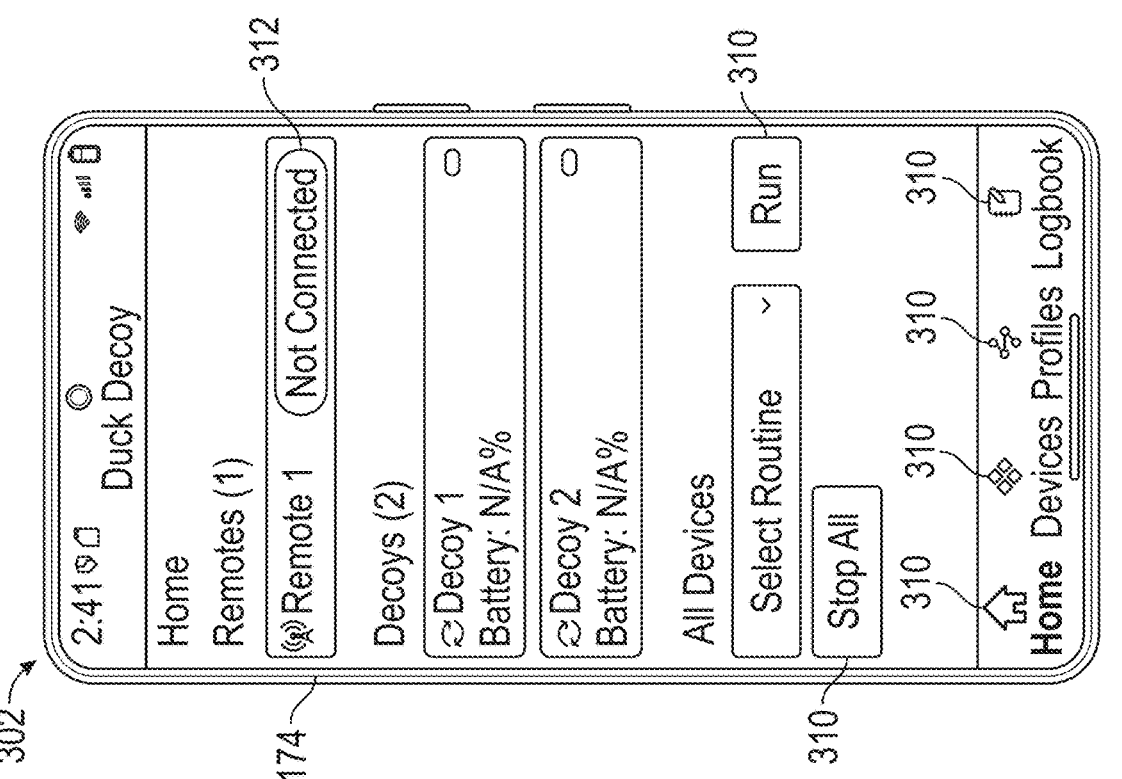
Figure 26:
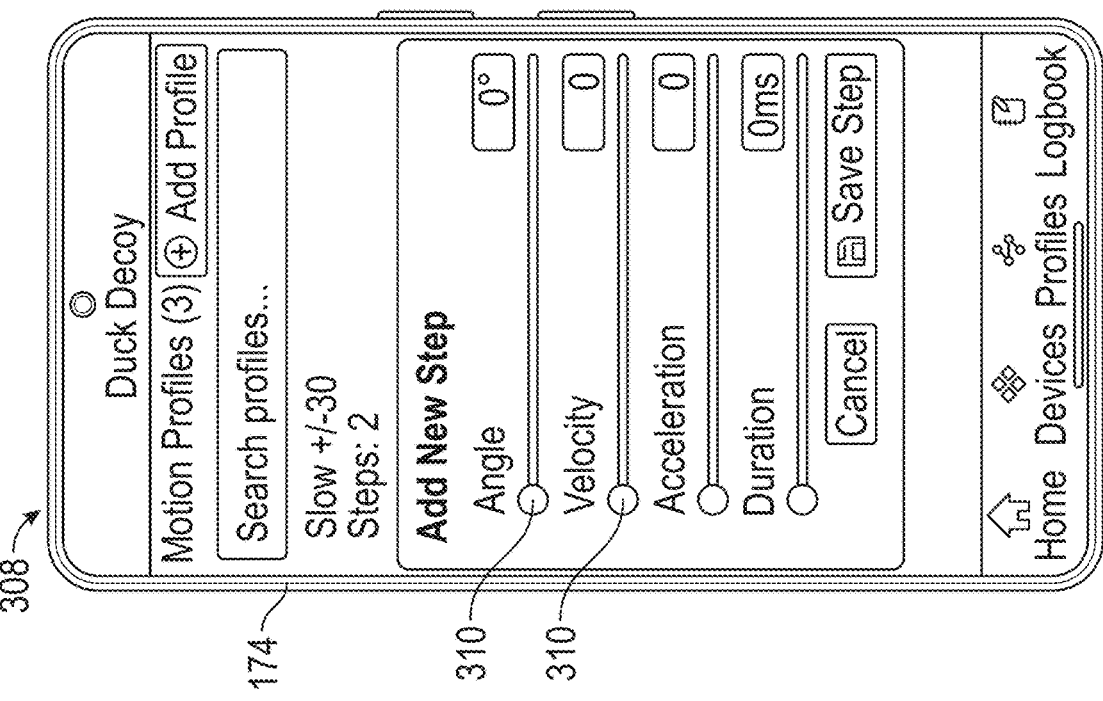
Figure 25:
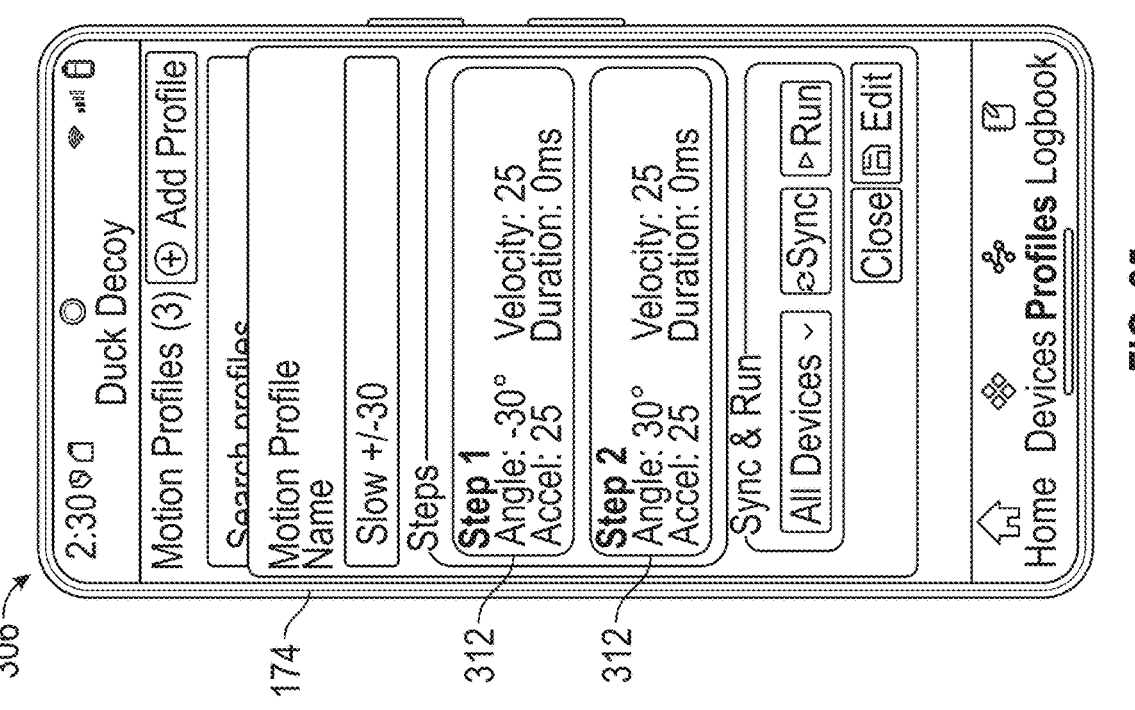

In at least one embodiment, jaws 240, 242 can be slide-ably coupled to one another and arranged to move linearly relative to one another between or among open and closed positions (see, e.g., FIGS. 17-18). In at least one embodiment, jaws 240, 242 can be rotatably coupled to one another and arranged to move rotate relative to one another between or among open and closed positions, such as about a rotational axis X (see, e.g., FIG. 22). In at least one embodiment, a clamping mechanism 234 (and/or another decoy mount, if present) can be rotateably coupled to frame 110, such as via a coupler 270 for coupling with a portion of frame 110 and having a rotatable coupling 272 for allowing a decoy mount and/or decoy to rotate relative to frame 110. Such a configuration can advantageously provide for a diving motion of a corresponding decoy 160. For example, system 100 can include one or more diver decoys, which can rotatably move between or among diving and non-diving positions, via rotatable coupling 272. In at least one embodiment, prime mover 130, or motion imparted from prime mover 130, can selectively rotate a diver decoy 160 towards a diving position, and such decoy 160 can be biased towards returning to a non-diving position, such as via floatation and/or one or more biasing devices. In at least one embodiment, prime mover 130, or motion imparted from prime mover 130, can selectively rotate a diver decoy 160 towards a non-diving position, and such decoy 160 can be biased towards returning to a diving position, such as via floatation and/or one or more biasing devices.

In at least one embodiment, any or all of the decoy mounts 140, 142, 144, 146 can include one or more hooks or clips 248 for supporting the coupling of a decoy 160 to the frame 110 and/or one or more other portions of system 100 (which clips 248 can be corded to one another, and/or to one or more other system components, and arranged for coupling with a decoy 160, for example). In at least one embodiment, one or more tie members, such as tie members 150, 152, 154, can include a rigid portion 156 and/or a flexible portion 158, and can couple with one or more of the decoy mounts 140, 142, 144, 146, which can include one or more hooks or clips 248, to the frame 110 and/or one or more other components of system 100, and/or can translate motion from the first decoy mount 140 and/or the prime mover 130 to any or all of the other decoy mounts 142, 144, 146 (and/or one or more other decoy mounts, if present).

In at least one embodiment, a decoy system 100 according to the disclosure can include one or more agitators 190, such as for agitating water in which the decoy system 100 is suspended or otherwise disposed, and one or more tie members 150, 152, 154 for translating motion of the first decoy mount to the agitator 190. In at least one embodiment, the agitator 190 can be or include one or more fins or paddles for agitating water. In at least one embodiment, the agitator 190 can move the frame 110. In at least one embodiment, the agitator 190 can be rotatably coupled to the frame 110. In at least one embodiment, the agitator 190 can be rotatably coupled to the frame 110 and/or one of the decoy mounts 140, 142, 144, 146 through or via one of the tie members 150, 152, 154, and be coupled to one of the decoy mounts 140, 142, 144, 146, such as to translate motion to one of the decoy mounts 140, 142, 144, 146. In at least one embodiment, the agitator 190 can function as a paddle and/or move the frame 110 and/or any or all of the decoy mounts 140, 142, 144, 146 relative to the water.

In at least one embodiment, a decoy system 100 according to the disclosure can include one or more decoy mounts 140, 142, 144, 146 that can impart rotation about a vertical (or other) axis to a decoy 160, such as for making the decoy 160 spin or twist in the water (i.e., a twisting decoy). In at least one embodiment, a decoy system 100 according to the disclosure can include one or more decoy mounts 140, 142, 144, 146 that can impart rotation about a horizontal axis to a decoy 160, such as for making the decoy 160 dive or dip into the water (i.e., a diving decoy). In at least one embodiment, a decoy system 100 according to the disclosure can include one or more decoy mounts 140, 142, 144, 146 that can impart motion to a decoy 160 for making the decoy 160 swim in the water (i.e., a swimming decoy). In at least one embodiment, a decoy system 100 according to the disclosure can include two twisting decoys, one diving decoy, and one swimming decoy. In at least one embodiment, a decoy system 100 according to the disclosure can include two twisting decoys and two swimming decoys. In at least one embodiment, a decoy system 100 according to the disclosure can include two diving decoys, one twisting decoy, and one swimming decoy.

As will be appreciated by those skilled in the art having the benefits of the present disclosure, aspects of one or more embodiments of the disclosure can be embodied as a system, method or computer program product. Accordingly, aspects of the present embodiments can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more non-transitory computer readable mediums having computer readable program code embodied thereon. Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of such computer read-able storage media include but are not limited to the fol-lowing: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium or media, including but not limited to wireless, wireline, optical fiber cable, radio frequency (RF), or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to a user's computer through any type of network, including a local area network (LAN) or a wide area network (WAN), or the connection may be made to an external computer (for example, through the Internet using an Internet Service Provider or via a short-range wireless interconnection such as Bluetooth).

Aspects of the present disclosure can be described with reference to flowchart illustrations and/or block diagrams of methods, apparatuses (devices and systems) and computer program products according to embodiments of the disclosure. Each block of a flowchart illustration and/or block diagram, and combinations of blocks in a flowchart illustration and/or block diagrams, can be implemented by computer program instructions. These computer program instructions may be provided to a processor of a general purpose computer, special purpose computer, or other programmable data processing apparatus to produce a machine, such that the instructions, which executed via one or more processors, create means for implementing the functions/acts specified in the flowchart and/or block diagram block or blocks. The computer program instructions can be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks. Each block in a flowchart and/or block diagram can be split into multiple blocks and/or combined with other blocks to make a single block.

In at least one embodiment, a decoy system can include a frame, a housing coupled to the frame, a prime mover disposed at least partially in the housing, a first decoy mount, which can be disposed at least partially above the housing, rotateably coupled to the frame, a second decoy mount moveably coupled to the frame, a first tie member coupled to the first decoy mount and the second decoy mount, or any combination thereof. In at least one embodiment, the prime mover can selectively rotate the first decoy mount. In at least one embodiment, the first tie member can translate motion to the second decoy mount, such as from the first decoy mount and/or the prime mover. In at least one embodiment, the decoy system can include a first decoy coupled to the first decoy mount. In at least one embodiment, the decoy system at least a portion of the housing can be disposed within the first decoy.

In at least one embodiment, the housing can include a first compartment and a second compartment. In at least one embodiment, the prime mover can be disposed in the first compartment and/or second compartment. In at least one embodiment, the decoy system can include a controller and/or a power source disposed in the other of the first and second compartments.

In at least one embodiment, the first tie member can be or include a rigid tie bar and/or rotate the second decoy mount, such as when the prime mover rotates the first decoy mount. In at least one embodiment, the first decoy mount can have a first axis of rotation. In at least one embodiment, the second decoy mount can have a second axis of rotation. In at least one embodiment, the first axis of rotation and the second axis of rotation can be at least substantially parallel to one another. In at least one embodiment, the first decoy mount can have a first degree of rotation. In at least one embodiment, the second decoy mount can have a second degree of rotation. In at least one embodiment, the first degree of rotation and the second degree of rotation can be at least substantially the same as one another or different from one another.

In at least one embodiment, the first tie member can be or include a pliable line and/or rotate the second decoy mount, such as when the prime mover rotates the first decoy mount. In at least one embodiment, the first decoy mount can have a first axis of rotation. In at least one embodiment, the second decoy mount can have a second axis of rotation. In at least one embodiment, the first axis of rotation and the second axis of rotation can be different from one another. In at least one embodiment, one of the first and second axis of rotation can be at least substantially vertical. In at least one embodiment, one of the first and second axis of rotation can be at least substantially horizontal. In at least one embodiment, one of the first and second axis of rotation can be at least substantially vertical and the other can be at least substantially horizontal.

In at least one embodiment, the decoy system can include a third decoy mount moveably coupled to the frame and/or a second tie member coupled to the second decoy mount and/or the third decoy mount. In at least one embodiment, the second tie member can translate motion to the third decoy mount. In at least one embodiment, the first tie member can be or include a rigid tie bar, and can rotate the second decoy mount, such as when the prime mover rotates the first decoy mount. In at least one embodiment, the second tie member can be or include a pliable line and can rotate the third decoy mount, such as when the prime mover rotates the first decoy mount. In at least one embodiment, the second decoy mount and the third decoy mount can have different axes of rotation. In at least one embodiment, the second decoy mount and the third decoy mount rotate in different directions. In at least one embodiment, any or all of the decoy mounts rotate in different directions. In at least one embodiment, the third decoy mount can be biased towards rotation in a first direction. In at least one embodiment, the pliable line can rotate the third decoy mount in a second direction that is opposite the first direction. In at least one embodiment, the third decoy mount can be biased towards a rest position by flotation.

In at least one embodiment, the frame can include a first frame member having a first end and a second end longitudinally opposite the first end. In at least one embodiment, the first end of the first frame member can be coupled to the housing. In at least one embodiment, the housing can be coupled to the first frame member between the first end and the second end, such as adjacent to a middle of the first frame member. In at least one embodiment, the second decoy mount can be coupled to the second end of the first frame member. In at least one embodiment, the second decoy mount can be rotateably coupled to the second end of the first frame member.

In at least one embodiment, the frame can include a second frame member having a first end and a second end longitudinally opposite the first end. In at least one embodiment, the first end of the second frame member can be coupled to the first frame member. In at least one embodiment, a third decoy mount can be coupled to the second end of the second frame member. In at least one embodiment, one end of the second frame member can be coupled to the first frame member and a third decoy mount can be coupled to the other end of the second frame member. In at least one embodiment, the third decoy mount can be rotateably coupled to the second frame member, such as the second end of the second frame member. In at least one embodiment, the first end of the second frame member can be removably coupled to the first frame member, such as between the first end and the second end of the first frame member. In at least one embodiment, the second frame member can be at least substantially perpendicular to the first frame member.

In at least one embodiment, the second decoy mount and/or the third decoy mount can be disposed rearwardly of the first decoy mount. In at least one embodiment, the third decoy mount can be disposed rearwardly of the second decoy mount. In at least one embodiment, the second decoy mount can be offset from the first decoy mount in one direction and the third decoy mount can be offset from the first decoy mount in another, different direction.

In at least one embodiment, the decoy system can include a third decoy mount coupled to the frame and a second tie member coupled to the third decoy mount. In at least one embodiment, the prime mover can selectively move any or all of the decoy mounts. In at least one embodiment, the prime mover can rotate the first decoy mount a first degree of rotation, the second decoy mount a second degree of rotation, the third decoy mount a third degree of rotation, or any combination thereof. In at least one embodiment, the second degree of rotation and/or the third degree of rotation can be different than the first degree of rotation.

In at least one embodiment, the prime mover can rotate the first decoy mount a first degree of rotation and a second degree of rotation greater than the first degree of rotation. In at least one embodiment, either or both of the second decoy mount and the third decoy mount can move after the first decoy mount surpasses the first degree of rotation. In at least one embodiment, either or both of the second decoy mount and the third decoy mount can be stationary as the first decoy mount moves through the first degree of rotation and move while the first decoy mount moves through the second degree of rotation.

In at least one embodiment, the decoy system can include one or more additional decoy mounts coupled to the frame. In at least one embodiment, any or all of the additional decoy mounts can be a moveable decoy mount movably coupled to the frame. In at least one embodiment, the prime mover can selectively move the moveable decoy mount. In at least one embodiment, all decoy mounts can be movably coupled to the frame. In at least one embodiment, the prime mover can selectively move any or all of the decoy mounts.

In at least one embodiment, the prime mover can be a servomotor. In at least one embodiment, the decoy system can include a programmable controller operably coupled to the servomotor and/or a remote control, such as in wireless communication with the controller.

In at least one embodiment, the decoy system can include one or more decoys coupled to any or all of the decoy mounts. In at least one embodiment, any or all of the decoys can be waterfowl decoys. In at least one embodiment, any or all of the decoys can be identical. In at least one embodiment, any or all of the decoys can be different.

In at least one embodiment, a decoy system can include a frame, a housing coupled to the frame, a prime mover, a first decoy mount rotateably coupled to the frame, a second decoy mount moveably coupled to the frame, and a first tie member coupled to the first decoy mount and the second decoy mount. The prime mover can selectively rotate the first decoy mount, and the first tie member can translate motion to the second decoy mount. In at least one embodiment, the first tie member can be or include a rigid tie bar, and the rigid tie bar can rotate the second decoy mount when the prime mover rotates the first decoy mount. The first decoy mount and the second decoy mount can be configured to rotate in the same direction or in different directions. The rigid tie bar can be configured to move the first decoy mount and the second decoy mount in parallel. The rigid tie bar can be coupled to the first decoy mount and/or the second decoy mount at one or more angles, such as 90 degrees, 45 degrees, or another angle for accomplishing a desired relative movement of two or more decoy mounts in accordance with an implementation of the disclosure. For example, one or more rigid tie bars can be coupled to one or more decoy mounts at an angle for effecting movement of one decoy mount that is different from the movement of another decoy mount.

In at least one embodiment, a decoy system can include a third decoy mount moveably coupled to the frame, and a second tie member coupled to the third decoy mount, and the second tie member can translate motion to the third decoy mount. In at least one embodiment, the second tie member can be a pliable line, and the pliable line can rotate the third decoy mount when the prime mover rotates the first decoy mount, directly, indirectly, or otherwise. In at least one embodiment, the second tie member can be a rigid tie bar, and the rigid tie bar can rotate the third decoy mount when the prime mover rotates the first decoy mount.

In at least one embodiment, a decoy system can include a fourth decoy mount moveably coupled to the frame, and a third tie member coupled to the fourth decoy mount, and the third tie member can translate motion to the fourth decoy mount. In at least one embodiment, a decoy system can include a fifth and/or other decoy mounts moveably coupled to the frame, and a fourth and/or other tie members coupled to the fifth and/or other decoy mounts, and the fourth and/or other tie members can translate motion to the fifth and/or other decoy mounts. In at least one embodiment, a decoy system can include one or more stationary decoy mounts coupled to the frame. In at least one embodiment, each movable decoy mount can move differently. In at least one embodiment, one or more decoy mounts can be arranged to move less than any other decoy mount.

In at least one embodiment, a decoy system according to the disclosure can include a frame, a housing coupled to the frame, a prime mover, a first decoy mount rotateably coupled to the frame about a first axis of rotation, a second decoy mount rotateably coupled to the frame about a second axis of rotation, a first tie member coupled to the first decoy mount and the second decoy mount, or any combination thereof. In at least one embodiment, the prime mover can be disposed at least partially in the housing. In at least one embodiment, the first decoy mount can be disposed at least partially above the housing. In at least one embodiment, the prime mover can selectively rotate the first decoy mount. In at least one embodiment, the first tie member can translate motion of the first decoy mount to the second decoy mount. In at least one embodiment, a decoy system according to the disclosure can include an agitator for agitating water in which the decoy system is suspended and a second tie member for translating motion of the first decoy mount to the agitator.

In at least one embodiment, the first axis of rotation and the second axis of rotation can be at least substantially parallel, substantially orthogonal, or aligned somewhere in between. For example, the first axis of rotation can be substantially vertical and the second axis of rotation can be substantially horizontal. In at least one embodiment, the first decoy mount can have a first degree of rotation and the second decoy mount can have a second degree of rotation. In at least one embodiment, the first degree of rotation and the second degree of rotation can be the same or different.

In at least one embodiment, a decoy system according to the disclosure can include a third decoy mount rotateably coupled to the frame about a third axis of rotation. In at least one embodiment, a decoy system according to the disclosure can include a second tie member for translating motion of the first decoy mount to the third decoy mount. In at least one embodiment, either or both of the second axis of rotation and the third axis of rotation can be substantially parallel and/or substantially orthogonal with respect to the first axis of rotation. In at least one embodiment, the third decoy mount can be biased towards rotation in a first direction, such as by a spring and/or floatation. In at least one embodiment, the second tie member can rotate the third decoy mount in a second direction that is opposite the first direction.

In at least one embodiment, a decoy system according to the disclosure can include a third decoy mount and a second tie member for translating motion of the first decoy mount to the third decoy mount. In at least one embodiment, the second tie member can be a flexible line or tether. In at least one embodiment, the third decoy mount can be coupled to the frame solely through the tether.

In at least one embodiment, the frame can include a first frame member having a first end and a second end longitudinally opposite the first end. In at least one embodiment, the first end of the first frame member can be coupled to the housing and/or the first decoy mount. In at least one embodiment, the second decoy mount can be coupled to the second end of the first frame member. In at least one embodiment, the frame can include a second frame member having a first end and a second end longitudinally opposite the first end. In at least one embodiment, the first end of the second frame member can be coupled to the first frame member. In at least one embodiment, a third decoy mount can be rotateably coupled to the second end of the second frame member. In at least one embodiment, the first end of the second frame member can be removably coupled to the first frame member, such as at a location between the first end and the second end of the first frame member. In at least one embodiment, the first end of the second frame member can be selectively rotatably coupled to the first frame member, such as at a location between the first end and the second end of the first frame member.

In at least one embodiment, a waterfowl decoy can be coupled to any or all of the decoy mounts. In at least one embodiment, a first decoy can be coupled to the first decoy mount and the housing, or a portion thereof, can be disposed within the first decoy. In at least one embodiment, one or more of the waterfowl decoys can be toollessly coupled to the second decoy mount. In at least one embodiment, any or all of the decoy mounts can include a first jaw, which can be rotateably coupled to the frame, and a second jaw slidably biased towards the first jaw, such as by a spring.

In at least one embodiment, a method according to the disclosure can include a method of making, using and/or implementing one or more portions or aspects of a decoy system according to the disclosure. In at least one embodiment, a non-transitory computer readable media according to the disclosure can have instructions stored thereon that, when executed by a processor, cause the processor to perform and/or cause the performance of any one or more of the method steps shown and/or described in the disclosure.

Other and further embodiments utilizing one or more aspects of the disclosure can be devised without departing from the spirit of Applicant's disclosure. For example, the devices, systems and methods can be implemented for numerous different types and sizes in numerous different industries. Further, the various methods and embodiments of the devices, systems and methods can be included in combination with each other to produce variations of the disclosed methods and embodiments. Discussion of singular elements can include plural elements and vice versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicant, but rather, in conformity with the patent laws, Applicant intends to fully protect all such modifications and improvements that come within the scope or range of equivalents of the following claims.

What is claimed is:

1. A decoy system, comprising:
a frame;
a housing coupled to the frame;
a prime mover disposed at least partially in the housing;
a first decoy mount rotateably coupled to the frame about a first axis of rotation;
a second decoy mount rotateably coupled to the frame about a second axis of rotation; and
a first tie member coupled to the first decoy mount and the second decoy mount;
wherein the prime mover is configured to selectively rotate the first decoy mount; and
wherein the first tie member is configured to translate motion of the first decoy mount to the second decoy mount.

2. The decoy system of claim 1, wherein the first axis of rotation and the second axis of rotation are at least substantially parallel.

3. The decoy system of claim 1, wherein the first axis of rotation and the second axis of rotation are at least substantially orthogonal.

4. The decoy system of claim 1, wherein the first axis of rotation is at least substantially vertical and the second axis of rotation is at least substantially horizontal.

5. The decoy system of claim 1, wherein the first decoy mount has a first degree of rotation and the second decoy mount has a second degree of rotation, and wherein the first degree of rotation and the second degree of rotation are different.

6. The decoy system of claim 1, further comprising:
a third decoy mount rotateably coupled to the frame about a third axis of rotation; and
a second tie member configured to translate motion of the first decoy mount to the third decoy mount.

7. The decoy system of claim 6, wherein the first axis of rotation and the second axis of rotation are at least substantially parallel and wherein the first axis of rotation and the third axis of rotation are at least substantially orthogonal.

8. The decoy system of claim 6, wherein the third decoy mount is configured to be biased towards rotation in a first direction, and wherein the second tie member is configured to rotate the third decoy mount in a second direction that is opposite the first direction.

9. The decoy system of claim 8, wherein the third decoy mount is configured to be biased towards the first direction by floatation when a decoy is coupled to the third decoy mount and suspended in water.

10. The decoy system of claim 1, further comprising:
a third decoy mount; and
a second tie member configured to translate motion of the first decoy mount to the third decoy mount.

11. The decoy system of claim 10, wherein the second tie member comprises a flexible tether and wherein the third decoy mount is coupled to the frame solely via the tether.

12. The decoy system of claim 1, wherein the frame comprises a first frame member having a first end and a second end longitudinally opposite the first end; wherein the first frame member is coupled to the housing; and wherein the second decoy mount is coupled to either the first end or the second end of the first frame member.

13. The decoy system of claim 12, wherein the frame comprises a second frame member having a first end and a second end longitudinally opposite the first end; wherein the first end of the second frame member is coupled to the first frame member; and further comprising a third decoy mount rotateably coupled to the second end of the second frame member.

14. The decoy system of claim 13, wherein the first end of the second frame member is removably coupled to the first frame member at a location between the first end and the second end of the first frame member.

15. The decoy system of claim 13, wherein the first end of the second frame member is selectively rotatably coupled to the first frame member at a location between the first end and the second end of the first frame member.

16. The decoy system of claim 1, further comprising at least one decoy coupled to each decoy mount.

17. The decoy system of claim 1, further comprising a waterfowl decoy toollessly coupled to the second decoy mount.

18. The decoy system of claim 1, wherein the second decoy mount comprises a first jaw and a second jaw biased towards the first jaw, and wherein the first and second jaws are configured to selectively couple with a decoy.

19. The decoy system of claim 1, further comprising a first decoy coupled to the first decoy mount; and wherein at least a portion of the housing is disposed within the first decoy.

20. The decoy system of claim 1, further comprising:

an agitator configured to agitate water in which the decoy system is suspended; and a second tie member configured to translate motion of the first decoy mount to the agitator.

* * * * *